(12) United States Patent
Dillon et al.

(10) Patent No.: US 9,323,247 B2
(45) Date of Patent: Apr. 26, 2016

(54) PERSONALIZED PLANT ASSET DATA REPRESENTATION AND SEARCH SYSTEM

(75) Inventors: Steven R. Dillon, White Bear Lake, MN (US); Gregory H. Rome, Maplewood, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 855 days.

(21) Appl. No.: 11/855,789

(22) Filed: Sep. 14, 2007

(65) Prior Publication Data

US 2009/0077055 A1   Mar. 19, 2009

(51) Int. Cl.
*G05B 23/02* (2006.01)
*G06F 17/30* (2006.01)

(52) U.S. Cl.
CPC ...... *G05B 23/0272* (2013.01); *G06F 17/30702* (2013.01)

(58) Field of Classification Search
CPC .................... G06F 17/30864; G06F 17/30867; G06F 17/30702; G06Q 30/02; G05B 23/0272
USPC ...................................... 707/3, 708
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,885,694 A | 12/1989 | Pray et al. |
| 4,907,167 A | 3/1990 | Skeirik |
| 4,910,691 A | 3/1990 | Skeirik |
| 4,922,412 A | 5/1990 | Lane et al. |
| 4,942,514 A | 7/1990 | Miyagaki et al. |
| 4,944,035 A | 7/1990 | Aagard et al. |
| 4,956,793 A | 9/1990 | Bonne et al. |
| 4,965,742 A | 10/1990 | Skeirik |

(Continued)

FOREIGN PATENT DOCUMENTS

| | | |
|---|---|---|
| CN | 1491382 A | 4/2004 |
| CN | 1661604 A | 8/2005 |

(Continued)

OTHER PUBLICATIONS

International Search Report and Written Opinion for Application No. PCT/US2008/074730, dated Jan. 27, 2009.

(Continued)

*Primary Examiner* — James E Richardson
(74) *Attorney, Agent, or Firm* — Marshall, Gerstein & Borun LLP

(57) ABSTRACT

A process control system collects data, or status information, pertaining to assets of a process plant from various sources or functional areas of the plant. The collected information may then be accessed by a user through a user interface routine displaying a graphical user interface to that user's computer. An asset data and search expert tracks user interaction with plant data by, for example, tracking the types of search fields a user most frequently searches with or the type of information a user more frequently browses for. The expert automatically profiles this tracked information to develop user preferences that are later used in personalizing the reporting of asset data, personalizing searching for asset data, and personalizing the results of such searches.

43 Claims, 25 Drawing Sheets

(56) References Cited

U.S. PATENT DOCUMENTS

| | | |
|---|---|---|
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,089,978 A | 2/1992 | Lipner et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Boone |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,329,443 A | 7/1994 | Bonaquist et al. |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,486,920 A | 1/1996 | Killpatrick et al. |
| 5,486,996 A | 1/1996 | Samad et al. |
| 5,488,697 A | 1/1996 | Kaemmerer et al. |
| 5,528,510 A | 6/1996 | Kraft |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,715,178 A | 2/1998 | Scarola et al. |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,777,872 A | 7/1998 | He |
| 5,781,432 A | 7/1998 | Keeler et al. |
| 5,790,898 A | 8/1998 | Kishima et al. |
| 5,796,606 A | 8/1998 | Spring et al. |
| 5,796,609 A | 8/1998 | Tao et al. |
| 5,798,939 A | 8/1998 | Ochoa et al. |
| 5,809,490 A | 9/1998 | Guiver et al. |
| 5,817,928 A | 10/1998 | Garvey, III et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,885 A | 1/1999 | Rusnica et al. |
| 5,859,964 A | 1/1999 | Wang et al. |
| 5,877,954 A | 3/1999 | Klimasauskas et al. |
| 5,880,716 A | 3/1999 | Kunugi et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A | 6/1999 | Cheney et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,033,257 A | 3/2000 | Lake et al. |
| 6,041,263 A | 3/2000 | Boston et al. |
| 6,047,221 A | 4/2000 | Piche et al. |
| 6,055,483 A | 4/2000 | Lu |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Haviena et al. |
| 6,108,616 A | 8/2000 | Borchers et al. |
| 6,110,214 A | 8/2000 | Kiimasauskas |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,246,972 B1 | 6/2001 | Klimasauskas |
| 6,298,454 B1 | 10/2001 | Schleiss et al. |
| 6,317,701 B1 | 11/2001 | Pyotsia et al. |
| 6,397,114 B1 | 5/2002 | Eryurek |
| 6,421,571 B1 | 7/2002 | Spriggs et al. |
| 6,445,963 B1 | 9/2002 | Blevins et al. |
| 6,567,718 B1 | 5/2003 | Campbell et al. |
| 6,625,511 B1 | 9/2003 | Suzuki et al. |
| 6,633,782 B1 | 10/2003 | Schleiss |
| 6,704,689 B1 | 3/2004 | Hogan et al. |
| 6,721,609 B1 | 4/2004 | Wojsznis |
| 6,774,786 B1 | 8/2004 | Havekost |
| 6,795,798 B2 | 9/2004 | Eryurek |
| 6,813,532 B2 | 11/2004 | Eryurek et al. |
| 6,965,806 B2 | 11/2005 | Eryurek et al. |
| 7,165,041 B1* | 1/2007 | Guheen et al. ............... 705/26.1 |
| 2002/0007298 A1 | 1/2002 | Jim et al. |
| 2002/0040395 A1* | 4/2002 | Davis et al. .................. 709/224 |
| 2002/0120697 A1* | 8/2002 | Generous et al. ............ 709/206 |
| 2002/0123864 A1 | 9/2002 | Eryurek et al. |
| 2003/0028269 A1 | 2/2003 | Spriggs et al. |
| 2003/0195934 A1 | 10/2003 | Peterson et al. |
| 2004/0186927 A1 | 9/2004 | Eryurek et al. |
| 2006/0004607 A1* | 1/2006 | Marshall ........... G06F 17/30699 705/2 |
| 2006/0074883 A1* | 4/2006 | Teevan et al. ..................... 707/3 |
| 2006/0089939 A1* | 4/2006 | Broda ................ G06F 17/3056 |
| 2006/0265507 A1* | 11/2006 | Banga et al. .................. 709/228 |
| 2007/0033129 A1* | 2/2007 | Coates ........................ 705/36 R |
| 2007/0118399 A1* | 5/2007 | Avinash et al. .................... 705/2 |
| 2008/0163066 A1* | 7/2008 | Gu .................... G06Q 10/0637 715/738 |
| 2009/0006358 A1* | 1/2009 | Morris ............. G06F 17/30672 |

(56) References Cited

U.S. PATENT DOCUMENTS

2010/0042445 A1* 2/2010 Nicosia ............ G06F 17/30017
705/7.15

FOREIGN PATENT DOCUMENTS

| EP | 0 612 039 A2 | 8/1994 |
|---|---|---|
| EP | 0 965 897 A1 | 12/1999 |
| EP | 1286289 | 2/2003 |
| EP | 1 445 721 | 8/2004 |
| GB | 2 347 234 A | 8/2000 |
| GB | 2353616 | 2/2001 |
| JP | 10-254531 A | 9/1998 |
| JP | 03-160596 B2 | 4/2001 |
| JP | 2002-341933 A | 11/2002 |
| JP | 2005-327143 A | 11/2005 |
| JP | 2006293611 A | 10/2006 |
| JP | 2007-316783 A | 12/2007 |
| WO | WO-00/49471 | 8/2000 |
| WO | WO-02/33603 A2 | 4/2002 |
| WO | WO-02/071173 | 9/2002 |
| WO | WO-03003193 A1 | 1/2003 |

OTHER PUBLICATIONS

AMS Device Manager with DeltaV, "AMS Suite: Intelligent Device Manager with DeltaV," Product Data Sheet, Nov. 2006, Emerson Process Management (6 pages).

"Components of GE Predictor™ Services," GE Industrial Systems, available at http://www.geindustrial.com/cwc/services?id=74 on Jul. 18, 2002.

CSI's Generic Oil Format, V.2.00, Website, 11 pages, Jul. 14, 1999 http://www.compsys.com/files/GENERIC.pdf.

"Customer Benefits," GE Industrial Systems, available at http://www.geindustrial.com/cwc/services?id=75 on Jul. 18, 2002.

"Electrical Equipment Coverage," GE Industrial Systems, available at http://www.geindustrial.com/cwc/services?id=72 on Jul. 18, 2002.

Emerson Process Management—CSI—Products: OilView LIMS Instrument Communication, Website, 1 page, © 1996-2001.

Emerson Process Management—CSI—Products: OilView LIMS Module, Website, 2 pages, © 1996-2001.

Emerson Process Management—CSI—Products: OilView Minilab Module, Website, 1 page, © 1996-2001.

Emerson Process Management—CSI—Products: OilView Wear Debris Analysis Module, Website, 2 pages, © 1996-2001.

Garvey, R., "Oilview® Reports for Managing Oil Analysis", Website, 11 pages, Oct. 21, 2002 http://www.compsys.com/enews/knewspro.nsf/v/RGAY-5DHPUX.

Garvey, R., "PPM by Volume and Size Distribution", Website, 6 pages, Sep. 16, 2002 http://www.compsys.com/enews/knewspro.nsf/v/RGAY-5CRJ7W.

Garvey, R., "Reporting with 32-bit OilView Software", Website, 3 pages, Apr. 10, 2000 http://www.compsys.com/enews/knewspro.nsf/v/DBRN-4Z7FZL.

Garvey, R., "Sample Scheduling", Website, 3 pages, Sep. 20, 2002 http://www.compsys.com/enews/knewspro.nsf/v/RGAY-5DHPMB.

Garvey, R., "Set Alarm Limits Using Statistics", Website, 2 pages, Jul. 26, 2000 http://www.compsys.com/enews/knewspro.nsf/v/DBRN-4Z7G2K.

Garvey, R., "Setting Alarm Limits", Website, 4 pages, Aug. 6, 2002 http://www.compsys.com/enews/knewspro.nsf/v/RGAY-5CRJ56.

Garvey, R., "Trivector Graphic", Website, 5 pages, Feb. 3, 2003 http://www.compsys.com/enews/knewspro.nsf/v/RGAY-5JES4Z.

Garvey, R., "Wear Debris Analysis Update", Website, 11 pages, Oct. 7, 2002 http:www.compsys.com/enews/knewspro.nsf/v/RGAY-5DHPUJ.

Garvey, R., "Wear Rates Impact Maintenance Priorities", Website, 9 pages, Nov. 18, 2002 http://www.compsys.com/enews/knewspro.nsf/v/RGAY-5FVRCE.

"GE Predictor™ Services: GE Predictor Services Overview," GE Industrial Systems, available at http://www.geindustrial.com/cwc/services?id=71 on Jul. 18, 2002.

Hayzen, T., "Managing Your Oil Analysis Program", 28 pages, (undated), Website Presentation found at: http://www.compsys.com/files/ManagingOilAnalysisProgram.ppt.

Hayzen, T., "OilView Laboratory Information Management System 'LIMS'", 27 pages, © 2000, Website Presentation found at: http://www.compsys.com/files/LIMS.ppt.

Hayzen, T., "Tribology Storybook", 20 pages, (undated), Website Presentation found at: http://www.compsys.com/files/TribologyStoryBookLetter.ppt.

International Search Report for PCT/US2004/007155, completed Aug. 25, 2004.

International Search Report of PCT/US02/05874, issued Nov. 13, 2002.

LIMS (Lab Information Management System) Technical Description, Product Information for OilView LIMS Module, http://www.compsys.com/marketing/LitCatalog.nsf/lookup/741197FBEBBC252A852569DC006FD245/$FILE/LIMS.doc.

"Mini Lab Report", Website, 5 pages, May 14, 2001 http://www.compsys.com/files/sample_minilab_report.pdf.

Product Data Sheet—PlantWeb Messenger, Website, 4 pages, Jan. 2003 http://www.easydeltav.com/pd/pds%5Fmessenger.pdf .

"Tribology Solutions: Reliability Based Maintenance", 8 pages, © 2002, Website Brochure found at: http://www.compsys.com/files/TribologyBrohiRes.pdf.

Written Opinion for PCT/US2004/007155 mailed Sep. 3, 2004.

International preliminary report and Written Opinion on patentability from PCT/US2008/074730 dated Mar. 25, 2010.

First office action from Chinese Application No. 200880110927.3 dated Oct. 26, 2011.

Office action from Japanese Application No. 2010-524915 dated Nov. 27, 2012.

Office action in counterpart Chinese patent application No. 200880110927.3, dated Apr. 16, 2013.

Decision of Rejection in Japanese Patent Application No. 2010-524915 dated Aug. 27, 2013.

Office Action cited in Japanese Application No. 2010-524915, dated Apr. 21, 2015.

English language translation of JP03160596 previously submitted on Jun. 3, 2015.

Third Office Action received in counterpart Chinese patent application No. 200880110927.3, dated Dec. 29, 2015.

* cited by examiner

FIG. 9

Browse | Search

Look in:
Asset Database ▼

Name: [          ]
Type: [          ]
Health: [          ]
Criticality: 60-100
Description: [          ]

[Search] [Clear]

---

Dashboard | Assets | Active Alerts | Event History

Sorted by: Relevance

| Name | Type | Health | Criticality | Description |
|---|---|---|---|---|
| PT-111 | Pressure Transmitter | 60 | 100 | Rosemount 3051 |
| PT-112 | Pressure Transmitter | 70 | 100 | Rosemount 3051 |
| PT-100 | Pressure Transmitter | 70 | 100 | Rosemount 3051 |
| PT-101 | Pressure Transmitter | 75 | 90 | Rosemount 3051 |
| PT-102 | Pressure Transmitter | 80 | 80 | Rosemount 3051 |
| PT-103 | Pressure Transmitter | 80 | 75 | Rosemount 3051 |
| PT-104 | Pressure Transmitter | 90 | 70 | Rosemount 3051 |
| PT-105 | Pressure Transmitter | 90 | 70 | Rosemount 3051 |
| PT-106 | Pressure Transmitter | 90 | 60 | Rosemount 3051 |
| PT-107 | Pressure Transmitter | 90 | 60 | Rosemount 3051 |
| PT-108 | Pressure Transmitter | 90 | 60 | Rosemount 3051 |
| PT-109 | Pressure Transmitter | 90 | 60 | Rosemount 3051 |
| PT-110 | Pressure Transmitter | 60 | 100 | Fisher Controls |
| IV-1000 | Valve | 70 | 100 | Fisher Controls |
| OV-1000 | Valve | | | |

| Name | Description | Area | HI | PI |
|---|---|---|---|---|
| CR-2000 | Dense Phase Compressor | B | 60 | 80 |
| SB-230 | Coke Boiler | B | 62 | 65 |
| CR-3000 | Export Gas Compressor | B | 65 | 65 |
| CR-1000 | Export Gas Compressor | B | 71 | 79 |
| HRSG-230X | Intermittent Duct Fired HRSG | A | 82 | 95 |
| ST-180 | Condensing Steam Turbine | A | 97 | 91 |
| CP-150 | Centrifugal Pump | A | 97 | 92 |

PERSONALIZED PLANT ASSET DATA REPRESENTATION AND SEARCH SYSTEM

BACKGROUND OF THE DISCLOSURE

1. Field of the Disclosure

The disclosure relates generally to process control systems within process plants and, more particularly, to techniques for reporting data and searching for data pertaining to assets in a process plant.

2. Brief Description of Related Technology

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS™) Suite Intelligent Device Manager or more generally the AMS™ Suite of applications available from Emerson Process Management enable communication with and store data pertaining to field devices to ascertain and track the operating state of the field devices. An example of such a system is disclosed in U.S. Pat. No. 5,960,214 entitled "Integrated Communication Network for use in a Field Device Management System." In some instances, the AMS™ Suite of applications may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant.

However, in the typical plant or process, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers which provide information to the operators about the operation of the process, including alerts generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. An example expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit.

On the other hand, maintenance personnel who are primarily responsible for assuring that the actual equipment within the process is operating efficiently and for repairing and replacing malfunctioning equipment, use tools such as maintenance interfaces, the AMS™ Suite of applications discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, applications in the AMS™ Suite of applications report device status and diagnostic information to the maintenance person and provide communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Because, for the most part, very different applications are used to perform the different functions within a plant (e.g., process control operations, maintenance operations and business operations are separated) such applications are not integrated and, thus, do not share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is a substantial amount of information about the health and performance of devices available to the maintenance person which could be helpful to the process operator and the business persons. Similarly, there is a substantial amount of information available to the process operator about the current operational status of the process control loops and other routines which may be helpful to the maintenance person or to the business person. Likewise, there is information generated by or used in the course of performing the business functions that could be helpful to the maintenance person or the process control operator in optimizing the operation of the process.

The abundance of information regarding process plants and the assets within them presents a problem to plant operators and other personnel, because obtaining plant information can be quite time-consuming as a user must wade through oftentimes large amounts of data to isolate down to the particular information of interest.

SUMMARY OF THE DISCLOSURE

In accordance with one aspect of the disclosure, a method of reporting status information regarding an entity within a process plant, the method comprising: receiving initial status information from a data source in response to a user request; prioritizing the initial status information based on historical user preference data to identify a subset of higher priority status information within the status information; generating a report that includes the higher priority status information ranked above other of the status information; and displaying the report to a user.

In accordance with another aspect of the disclosure, an apparatus for reporting status information on assets in a plant comprises: a memory storing status information on the assets within the plant; a display for displaying the stored status information; and a status information reporter configured to: a) receive initial status information from a data source in response to a user request; b) prioritize the initial status information based on historical user preference data to identify a subset of higher priority status information within the status information; and c) generate a report that includes the higher priority status information ranked above other of the status information.

BRIEF DESCRIPTION OF THE DRAWING FIGURES

For a more complete understanding of the disclosure, reference should be made to the following detailed description and accompanying drawing figures, in which like reference numerals identify like elements in the figures, and in which:

FIG. 9 illustrates yet another example graphical display of a personalized search report automatically generated by an asset data and search reporter in response to user search criteria;

FIG. 12A illustrates another example personalized search report;

Figure 1:
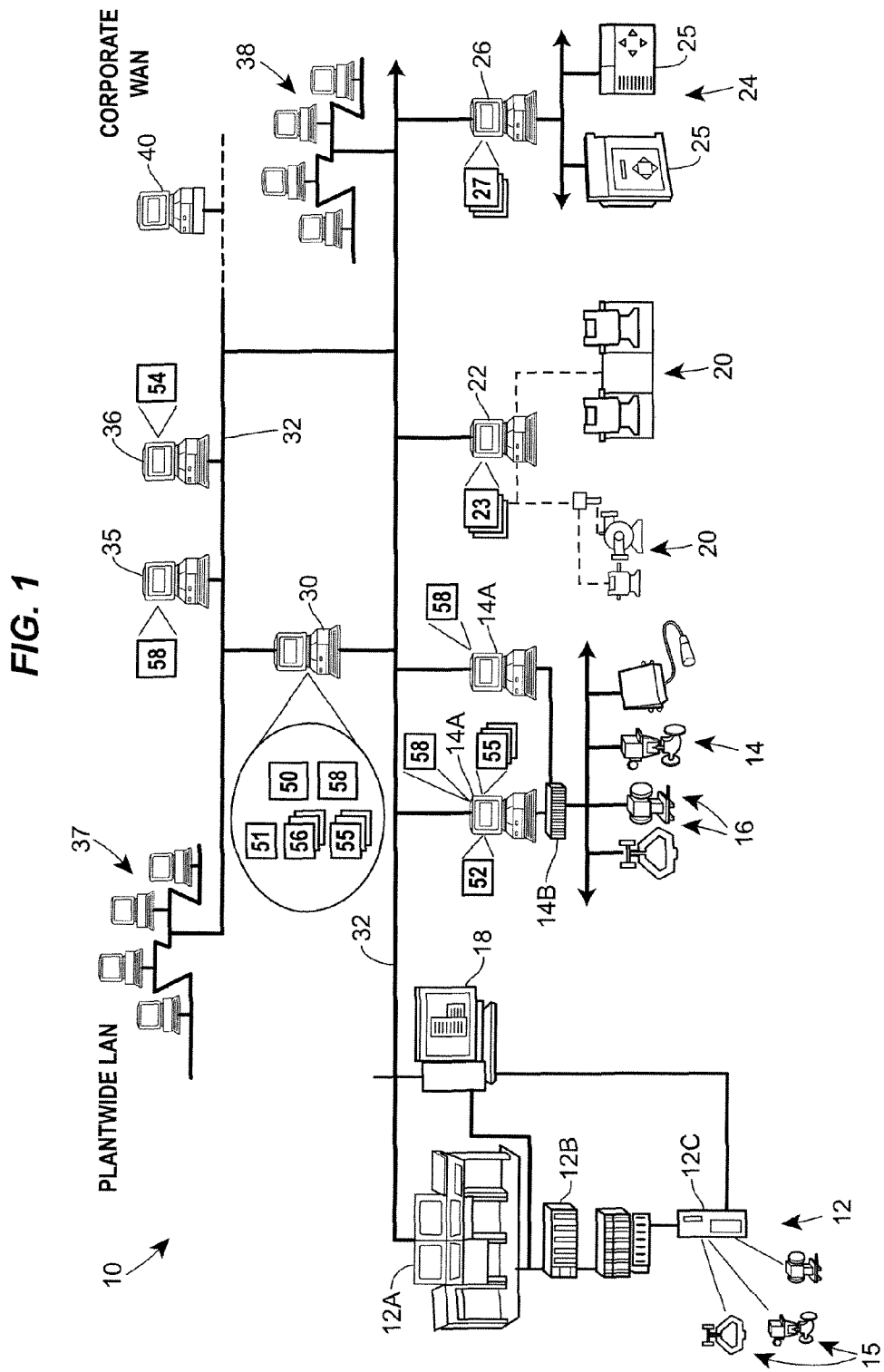
FIG. 1 illustrates a processing plant.

While the disclosed methods and apparatuses are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART®) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers available from Emerson Process Management or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing an AMS™ Suite application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ Suite of applications may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example the AMS™ Suite: Machinery Health Manager available from the Asset Optimization Division of Emerson Process Management or any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), computer maintenance management systems (CMMS), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML/XSL protocol. Here, data from each of the computers 12A, 18, 14A, 22, 26, 35, 36, etc. is wrapped in an XML/XSL wrapper and is sent to an XML/XSL data server which may be located in, for example, the computer 30. Because XML/XSL is a descriptive language, the server can process any type of data. At the server, if necessary, the data is encapsulated with a new XML/XSL wrapper, i.e., this data is mapped from one XML/XSL schema to one or more other XML/XSL schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset management system 50 that collects data and other information generated by the process control systems 12 and 14, the maintenance systems 18, 22 and 26 and the business systems 35 and 36 as well as information generated by data analysis tools executed in each of these systems. The asset management system 50 may be based on, for example, the OZ expert system currently provided by NEXUS. However, the asset management system 50 may be any other desired type of expert system including, for example, any type of data mining system. Importantly, the asset management system 50 operates as a data and information clearinghouse in the process plant 10 and is able to coordinate the distribution of data or information from one functional area, such as the maintenance area, to other functional areas, such as the process control or the business functional areas. The asset management system 50 may also use the collected data to generate new information or data which can be distributed to one or more of the computer systems associated with the different functions within the plant 10. Still further, the asset management system 50 may execute or oversee the execution of other applications that use the collected data to generate new types of data to be used within the process plant 10.

In particular, the asset management system 50 may include or execute index generation software 51 that creates indices associated with devices, like process control and instrumentation devices, power generation devices, rotating equipment, units, areas, etc, or that are associated with process control entities, like loops, etc. within the plant 10. These indices can then be provided to the process control applications to help optimize process control and can be provided to the business software or business applications to provide the business persons more complete or understandable information associated with the operation of the plant 10. The asset management system 50 can also provide maintenance data (such as device status information) and business data (such as data associated with scheduled work orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired. In one embodiment, the control expert 52 may be, for example, the control expert described in U.S. patent application Ser. Nos. 09/256,585 and 09/499,445 identified above.

Additionally, the asset management system 50 can send information to one or more optimizers 55 within the plant 10. For example, a control optimizer 55 can be located in the computer 14A and can run one or more control optimization routines 55. Additionally or alternatively, optimizer routines 55 could be stored in and executed by the computer 30 or any other computer, and the data necessary therefore could be sent by the asset management system 50. If desired, the plant 10 may also include models 56 that model certain aspects of the plant 10 and these models 56 can be executed by the asset management system 50 or a control or other expert such as the control expert 52 to perform modeling functions, the purpose of which is described in greater detail in U.S. patent application Ser. No. 10/085,439 entitled "Creation and Display of Indices in a Process Plant," which was filed on Feb. 28, 2002, which is expressly incorporated by reference herein. Generally speaking, however, the models 56 can be used to determine device, area, unit, loop, etc. parameters, to detect faulty sensors or other faulty equipment, as part of optimizer routines 55, to generate indices such as performance and utilization indices for use in the plant 10, to perform performance or condition monitoring, as well as for many other uses. The models 56 may be models such as those available through the AMS™ Suite Optimizer and Performance Monitor available from the Performance and Optimization Division of Emerson Process Management or may be any other desired types of models.

The computer 30 may further store and execute an asset data/search reporter 60. Generally speaking, the asset data/search reporter 60 receives status information from data sources, including the asset management system 50, data tools, data collectors, data generators, etc., and generates a report for a user. A report is generated to display the status information, or a depiction representing the status information, to the user in accordance with a user profile. The report may be presented by one or more user interface routines 58 and tailored to the user's preferences as contained in the user profile. The user profile may also contain information about the user, such as the user's responsibilities within the plant, to determine what status information the user must view, must not view and may optionally view. For example, a maintenance person may generally be responsible for monitoring the health of a device. In addition, the maintenance person may be interested in how the device is being operated by a process operator. The maintenance person's responsibilities and interest may be reflected in the user profile. When a maintenance report is generated by the asset data/search reporter 60, the user profile of the maintenance person is read and a report is generated that contains the status information regarding the health of the device, regardless of the maintenance person's preferences. The report may also contain status information regarding the performance and productivity of the device, which is an optional type of status information available to the maintenance person that the maintenance person has indicated a preference for, as reflected in the user profile. However, the user profile may also contain restrictions on what the maintenance report may contain. For example, the maintenance person may be restricted from seeing status information about the financial health of the process plant.

Also, generally speaking, the one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset data/search reporter 60 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indices created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as from the AMS™ Suite Intelligent Device Manager available from the Asset Optimization Division of Emerson Process Management or any other maintenance programs. Of course, the user interface routine 58 may provide any user access to and enable the user to change preferences or other variables used in any or all functional areas of the plant 10.

Figure 2:
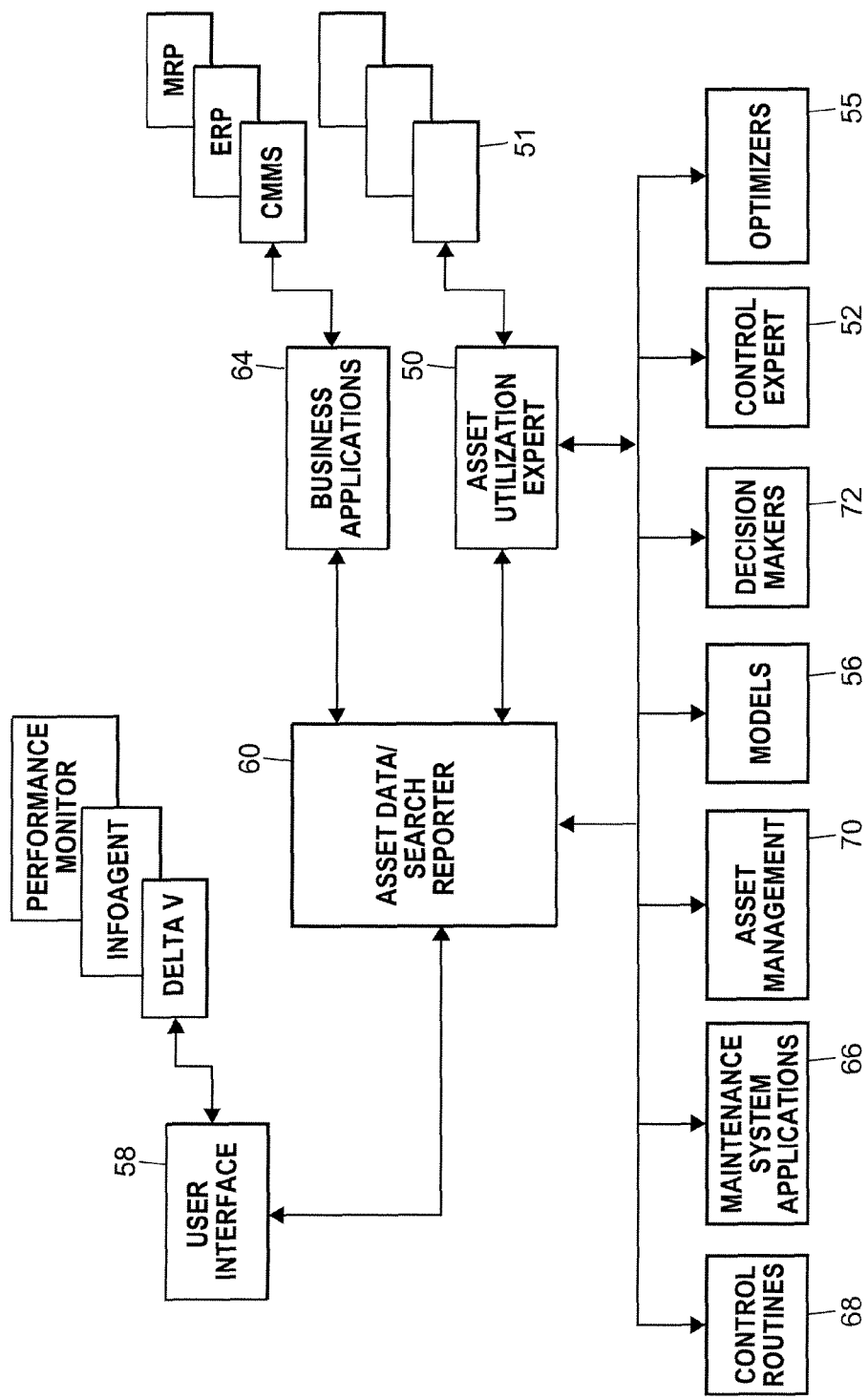
FIG. 2 is a data and information flow diagram with respect to an asset management system within the plant of FIG. 1 and showing an asset data and search reporter in accordance with the present application.

Referring now to FIG. 2, a data flow diagram illustrating some of the data flow between an asset data/search reporter 60 and other data tools or data sources within the process plant 10 according to an example is provided. In one embodiment, the asset data/search reporter 60 receives information from information sources which may run various routines and applications for providing status information regarding devices, loops, units, areas, etc. within a process plant. The asset data/search reporter 60 may be incorporated with a central data collecting, sharing and distribution application, such as the asset management system 50 described above which receives much of the status information from the various data tools and data sources, or provided as a separate application. The asset data/search reporter 60 may be centrally located at a particular server, which may be maintained locally at the plant 10 or remotely from the plant 10. Alternatively, the asset data/search reporter 60 may be distributed among several computers such as business system computers 35, maintenance computers 18, 22, and 26 maintenance planning computers 36. Furthermore, the asset data/search reporter 60 may be a network application available over the Internet and/or the plantwide LAN 37 and available to various personnel through user interfaces 12A, 14A, 58.

As mentioned above, the asset data/search reporter 60 receives status information from various data sources, which may include data collectors, data generators or data tools including index generation routines 51, the control expert 52, optimizers 55, model generation routines 56, business applications 64, maintenance system applications 66, control routines 68, asset managers 70, decision makers 72, etc. In one embodiment, the asset data/search reporter 60 may receive information from the asset management system 50 described above, and which is described further in U.S. patent application Ser. No. 10/085,439 referred to above. This information may include indices related to the health, performance, utilization and variability of a particular device, loop, unit, area, etc. This data can take on any desired form based on how the data is generated or used by other functional systems. Still further, this data may be sent to the asset data/search reporter 60 using any desired or appropriate data communication protocol and communication hardware, such as the XML/XSL protocol discussed above. Generally speaking, however, the plant 10 will be configured so that the asset data/search reporter 60 automatically receives specific kinds of data from one or more of the data sources.

In addition to receiving indices from the asset management system 50, optimization information from optimizers 55, such as the AMS™ Suite Real Time Optimizer available from Emerson Process Management, may be received by the asset data/search reporter 60. In one embodiment, the AMS™ Suite Real Time Optimizer real time optimization routine may be used as a real time optimizer and may be executed at various or periodic times during operation of the plant 10. The AMS™ Suite Real Time Optimizer real time optimization routine is described in greater detail in U.S. patent application Ser. No. 10/085,439 mentioned above. The AMS™ Suite Real Time Optimizer optimization routine first executes an input phase during which the routine checks to determine whether the variables that were previously indicated as being variables which could be manipulated by the optimizer to perform optimization, such as set points or other inputs of various devices, units, etc., can actually be manipulated at the current time. This information may be available to the optimizer from the asset management system 50 which obtains this information from the process control system and stores this information within any desired database. Thus, during the input phase, the optimizer actually determines, based on the data provided to it from the asset management system 50, whether each of the possible manipulated inputs is still available to be changed. The real time optimizer may also determine if the variables that were supposed to change during the last run of the optimizer were actually changed to and reached the suggested or calculated values from the last run of the optimizer. Detecting a failure of a variable to reach a value that it should have theoretically reached may also cause the optimizer to report to an operator that there may be a problem within the system that needs to be addressed. Next, the optimizer performs a quick execution of each of the individual component models that make up the entire model using, for example, the actual inputs and outputs measured from the plant 10. The calculated outputs of each component model are then reviewed to see if there is any problem with any particular component model that will prevent the entire model from running accurately. Assuming that each of the component models can be executed, the optimizer may look for discrepancies in the models that may affect the ability of the optimizer to optimize.

In addition to receiving optimization information from the optimizers 55, the asset data/search reporter 60 may, in some examples, perform optimization functions such as those described with respect to the asset optimization reporter described in U.S. application Ser. No. [10/390,818], entitled "Asset Optimization Reporting in a Process Plant," the entire specification of which is incorporated herein by reference. Some example features are provided below.

In an optimization mode, for example, the asset data/search reporter 60 may run individual models in a predetermined order using the outputs from one component model as inputs to one or more of the other component models making up the entire model. Using the entire model, the constraints provided by the user and the new constraints determined by the input phase, as well as the optimization criteria, the optimizer could determine the changes to be made to the input or manipulated variables which have been detected as currently being capable of manipulation which will optimize the plant over the time window in which the optimizer runs. Optimization criteria may be typically performed by a business person or business application. The asset management system 50 may provide the business person, via the user interface routines 58, a systematic set of choices of what the optimization criteria will be at any particular time and provides the choices made by the operator or any other user to the optimization routine.

In fact, there are many optimization variables that can be selected and the choice of these different criteria may be provided to the operator or business person via the user interface to allow the operator or business person to choose different optimization criteria in any desired manner.

In an optimization mode, the asset data/search reporter 60 may determine if the manipulated variables or inputs to be changed are still available. If all of the manipulated variables to be changed can still be changed, the suggested changes may be provided to an operator via, for example, the user interface (e.g., a graphical user interface). The operator may be able to simply press a button and have the changes to the manipulated variables initiated or downloaded to the process control routine automatically, such as changing set points, etc. in a matter determined by the optimizer. In another embodiment or in later stages of operation, for example, when the process is running properly, the optimization mode may automatically implement the suggested changes if the operator does not prevent the instantiation of the changes within a particular time window. A user may interface with the asset data/search reporter 60 in optimization mode through one or more of the user interface routines 58, which provide a screen to the operator indicating the suggested changes to be made and a button or bar which the operator uses to install the changes or to prevent the changes from being installed. The user may then push a button to install the changes, from which all of the changes are sent to the appropriate controllers where they are checked for limits and then implemented.

Other optimizer functions, such as selection optimizers, may determine whether changes in the process configuration that need to be performed by the operator or maintenance person could better optimize the process. For example, in some cases, a selection optimization mode may recognize that certain units or other manipulated inputs that are supposed to be available are no longer available for some reason. The selection optimizer runs one or more optimization tests assuming that one or more of these devices, units, etc. are available, to determine how much better the plant 10 would operate if these entities were put back into operation.

The asset data/search reporter 60 extends beyond the capabilities of an asset optimization reporter, however, to provide personalized or profile-based asset data reporting and searching. As explained in more detail below, the asset data/search reporter 60 may provide personalized or profile-based asset data to a user allowing the user to view a reduce set of the asset data, tailored to them, instead of all of the asset data. This may reduce the amount of time spent and GUI menus and screens reviewed by a user when manually searching through plant asset data. The asset data/search reporter 60 may also improve plant asset data searches by ranking search results based on historical data collected during user operation. The asset data/search reporter 60 may track user interaction with the system during the display of asset data. This tracking allows the asset data/search reporter 60 to record profile data specific to the user, to an asset, to a unit in the plant, to a process, or other grouping. The tracked data, for example, can record the frequency with which a user or group of users accesses a particular type of asset or asset data field and from this frequency prioritize the assets based on those most frequently accessed.

As discussed further below, the asset data/search reporter 60 may rank assets based on any traceable historic data. The data may include asset data, such as health, utilization, variability, or performance index, an alert status, an urgent event status, or any other asset data. One example is the percentage of time a user views particular plant data, such as status information pertaining to any asset of interest, including any unit area, device, or process. For example, if a user is recorded as having viewed a particular plant area (including multiple assets—units, devices, loops, etc.), then the asset data/search reporter 60 may record that information as use preference data indicating that to the user (or users) this particular area of the plant may have a higher priority. If the same user, or in some cases another user, performs a search for assets in a plant, then the asset data/search reporter 60 may list first (or in other examples only) those assets in the higher priority area(s). This higher priority listing may take the place of the typical all-encompassing listing or the listing may be presented to a user in a separate GUI format. The desire is that this higher priority listing will allow users to more quickly narrow down the relevant data for a particular search or inquiry instead of having to go through all levels and sub levels to identify the desire asset data.

In addition to ranking plant assets based on the time, the asset data/search reporter 60 may rank based on the number of times a particular asset has been accessed by a user, the number of times an asset has received an alert condition, the number of times an asset has received maintenance, the time since the last maintenance (listing the longest time assets first, for example), a user tracked correlation between asset data, or any other historical data derivable from user interaction with the system. Furthermore, the user need not be a user that interacts with the system containing the asset data/searcher 60. The historical data used to determine a user profile may be from business personal operating the business applications 64, maintenance personnel interacting with a maintenance system, process personnel interacting with a process system, or other personnel of operating on other systems in the plant.

Furthermore, the resulting listings may be based off of single or multiple profiled parameters (user preference) variables. For example, the asset data/search reporter 60 may identify a first level profile parameter, a second level profile parameter, a third level profile parameter, and so on. The asset data/search reporter 60 may then rank assets based on the first level profile parameter (e.g., plant area), and for each group of assets satisfying this particular first profile parameter subrank those assets based on a second level profile parameter (e.g., health index). A similar further sub-ranking could occur for any additional profile parameters.

Returning to FIG. 2, to affect data collection and presentation, controllers and control routines 68, such as DeltaV™ described above, may provide control information to the asset data/search reporter 60, including operating equipment effectiveness, alarms, alerts, production analyses, cost analyses (e.g., cost of fixing, cost of running the device until failure), efficiency, etc. The AMS™ Suite: Intelligent Device Manager, or other maintenance system applications 66, may provided maintenance information, such as the health of a device, maintenance status, downtime analyses (e.g., costs of downtime, cause of downtime, etc.), calibration information, cost analysis, work orders, etc. A work order/parts order generation routine is described in further detail in U.S. patent application Ser. No. 10/086,159 entitled "Automatic Work Order/Parts Order Generation and Tracking" the content of which is expressly incorporated by reference herein. AMS™ Suite: Machinery Health Manager or other known asset management applications 70 provide monitoring, diagnostic and optimization information regarding various equipment, including rotating equipment 20. Information from running mathematical software models 56, as provided by MDC Technology or other model generation applications, are further provided to the asset data/search reporter 60 and may provide modeled status information relating to some or all of the equipment within the process plant 10, including modeled information relating to device models, loops models, unit models, area models, etc. The data from the models 56 may be used or provide predictive control or real time optimal control within the plant 10, including predictive maintenance alerts, predictive maintenance quality assurance, etc. Further, the data generated by the models may be used to generate indices to be used by other applications, such as business and process control applications. Examples of models are described in further detail in U.S. patent application Ser. No. 10/085,439, referred to above. Business applications 64, such as enterprise resource planning (ERP) tools, material resource planning (MRP) tools, computer maintenance management systems (CMMS) or other business applications, may provide business information including key performance indicators (KPIs), economics information, plant yield, stock information, production planning, material resource planning, etc., and engage in business-to-business applications to communicate parts orders, work orders, supply orders, etc. KPIs may include anything from economic indicators, such as profit margins (e.g., profit made per sale), capitol turnover rate (sales per capitol employed) profitability (e.g., profit per capitol investment, profit margin times capitol turnover rate), to asset specific indicators, such as operating equipment effectiveness (OEE), described further below, and supporting metrics. KPIs may further include status information relating to maintenance and operational functions, and is not solely limited to business information.

Each of the above described data sources may provide the information directly to the asset data/search reporter 60 and/or via another application. For example, optimizers 55, control routines 68, control experts 52, business applications 64, maintenance system applications 66, asset managers 70, decision makers 72, etc. may provide status information to both the asset data/search reporter 60 and to the asset management system 50 to generate further status information, such as indices, or to execute models 56. The status information from the asset management system 50 would then be provided to the asset data/search reporter 60. In other words, status information may be shared among the various data sources (e.g. tools, applications, etc.) within the process plant 10 in order to generate further status information, though all of the status information may be made available to the asset data/search reporter 60.

As mentioned generally thus far, a plant 10 is comprised hierarchically related entities within the plant 10, such as areas, units, loops, devices, etc., where the plant 10 may be considered an entity in and of itself. The hierarchical arrangement may be arranged where the plant 10 includes various areas, which in turn include various units, that in turn include various loops and devices. Each of these entities are generally interrelated and interconnected within the process plant 10. For example, areas may include devices interconnected with units, loops, etc. In this example hierarchy, lower level entities, such as devices, may be interconnected to form higher level entities, such as units, which in turn may be interconnected to form yet higher level entities such as areas, and so on.

One or more coordinated user interface routines 58 may communicate with the asset data/search reporter 60, as well as any other applications within the plant 10 to provide help and visualization to operators, maintenance persons, business persons, etc. regarding any level within the process plant 10. The operators and other users may use the coordinated user interface routines 58 to perform or to implement predictive control, change settings of the plant 10, view help within the plant 10, or perform any other activities related to the information provided by the data sources. The user interface routines 58 may include an operator guidance tool that receives information from the control expert 52 as well as information related to the indices, which can be used by an operator or other user to help perform many functions such as viewing the status of a process or devices within the process, to guide the predictive control expert 52 or to perform predictive or optimized control.

Still further, the user interface routines 58 may be used to view data or to obtain data from any of the data sources in the other parts of the process plant 10 via, for example, the asset management system 50. For example, managers may want to know what is happening in the process or may need high level information related to the process plant 10 to make strategic plans. Operators, on the other hand, may want to know what is happening with the health of a device within the loop or area that the operator is monitoring and operating. Maintenance personnel, in turn, may be interested in how hard an operator is utilizing a device in order to alert that operator to potential problems with the device due to the operator's use. The pooling of status information at the asset data/search reporter 60 described above, provides a centralized source for reporting on the various entities within the process plant 10 to each of the various personnel rather than requiring a user to access each particular data source separately. It will be understood that the asset data/search reporter 60, via a user interface routine 58, can report on one or more entities using one of the monitoring techniques described above and can report status information of these entities to any desired persons, such as to a maintenance person, a business person, a process operator, etc., thereby eliminating the need for separate reports for each entity, data source, etc. It will also be understood that the asset data/search reporter 60 may present report personalized or profile-based information tailored to the particular user request input at the user interface routines 58 and based on past user interaction with the user interface routines 58. For example, these user interface routines 58 may present users with plant asset data from which the asset data/search reporter 60 tracks user interaction and viewing to develop historical (profile) data that is later used to tailor the user interface routines 58 upon the users next interaction therewith.

Some examples of existing user interface routines 58 that may be modified in response to the asset data/search reporter 60 include AMS™ Suite: Performance Monitor available from Emerson Process Management which may be used to report equipment performance information. AMS™ Suite: Performance Monitor is generally a web-based application that allows users to monitor equipment performance from remote locations. For example, a remote monitoring application could provide a user with access to optimizers and other data sources, including the ability to execute various data tools such as process control tools, process monitoring tools, equipment or device monitoring tools, index generation tools, worked order generations tools, business or other tools or applications. The results from the data sources can then be sent back to the remote location as plots, charts, suggested actions, indices, or any other results capable of being provided. Remote monitoring examples are described further in U.S. patent application Ser. No. 09/852,945 entitled "Remote Analysis of Process Control Plant Data," which was filed on May 10, 2001 and which is hereby expressly incorporated by reference herein. However, other web-based monitoring and reporting applications may also be utilized. Additional interface routines 58 includes DeltaV™ which may be used to report control information. Information regarding rotating equipment may be reported via a user interface as described in U.S. Pat. No. 5,817,928, which is hereby expressly incorporate by reference herein. A variation of this user interface is further applicable beyond rotating equipment, as described further below. Further examples of user interface routines 58 are described in U.S. patent application Ser. No. 10/085,439 mentioned above. However, other examples of a user interface routine 58, including the user interface routine 58 describe below, may be used alternatively or in conjunction with the user interface routines 58 described thus far. The choice or format of user interface routine 58 may be dependent on the type of status information being reported or the particular user viewing the status information.

Generally, the user interface routines 58 provide a graphical user interface (GUI) that is integrated with the asset data/search reporter 60 to facilitate a user's interaction with the various capabilities provided by the different data sources. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system. For example, the user interface routine 58 and GUI may be incorporated as part of a web-based software routine that permits a user to view reports via a network connection, such as over the Plantwide LAN 37, the Internet, or other communications system, thereby allowing a user to view a report on a device, loop, unit, area, etc. remotely from where that device, loop, unit, area, etc. is located or even remotely from the process plant 10. For example, reports, or summaries thereof, may be sent to phones, pagers, electronic mail, etc. This may be particularly useful if the report is time critical (e.g., a device failure alert). An example of a method and system that could permit a user to view reports via a communications system to a pager, cellular phone, personal digital assistant, email address, laptop computer, desktop computer, or any other type of device or hardware platform may be found in U.S. patent application Ser. No. 10/123,445 entitled "Web Services-Based Communications For Use With Process Control Systems," which was filed on Apr. 15, 2002, and which is expressly incorporated herein by reference.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the above data sources may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the above data sources.

For example, the GUI provides intuitive graphical depictions or displays of process control areas, units, loops, devices, etc. Each of these graphical displays may include numerical, textual and graphical displays of status information regarding any entity within the process plant 10. For example, a display depicting a process control area may provide corresponding status information of that area (i.e., a particular portion of the process control system at a particular level of the equipment hierarchy). On the other hand, a display depicting a loop may provide status information associated with that particular loop. In any event, a user may use the status information shown within any view, page or display to quickly assess whether a problem exists within any of the devices, loops, etc. depicted within that display.

Additionally, the GUI described herein may automatically, or may in response to a request by a user, provide status information to the user regarding any entity within the process plant 10. However, depending on the type of information or the security clearance of the particular user, restrictions may be imposed on the basis of the type of status information or on the basis of the particular entity or level. For example, a maintenance person may be restricted to status information regarding the device the maintenance person is responsible for, in addition to status information that may have an immediate or proximate effect on the device, such as information regarding the efficiency and utilization of the device or of the loop that the device is a part of. On the other hand, the maintenance person may be restricted from viewing information related to the efficiency of the process plant 10 as a whole or from viewing sensitive business information. In other cases, such as with the manager of the process plant 10, all status information regarding any entity or level of the process plant 10 may be made available to the user.

Figure 3:
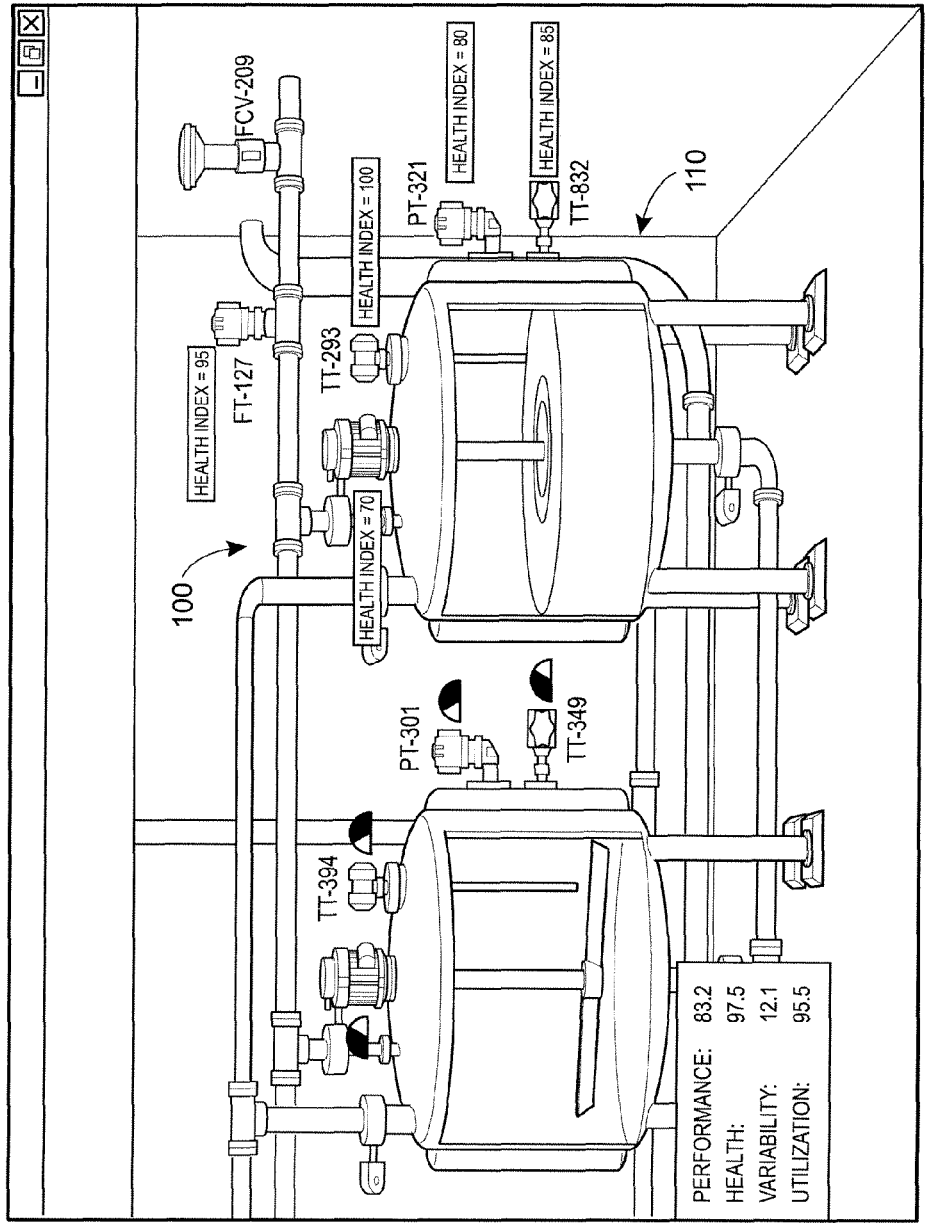
FIG. 3 is an exemplary depiction of a display representing a unit within a process control system that may be displayed by a graphical user interface.

FIG. 3 is an example graphical display that may be provided by the GUI to report status information to a user and enable a user to quickly analyze the operational status and performance of a process area within the plant 10. As shown in FIG. 3, the GUI may graphically depict the physical equipment (and the interconnections therebetween) within a process area 100. Of course, it should be recognized that although a process area is depicted within the GUI display, any other portion of the plant 10 such as, for example, a unit, sub unit, loop, device, etc. may be shown instead to achieve the same or similar results. In any event, the process area 100 is depicted as having a pair of tanks, a plurality of temperature transmitters, pressure transmitters, flow transmitters, etc. and pipes, all of which may be interconnected as shown in FIG. 3. Further, each of the physical devices may be displayed along with an associated alphanumeric identifier (e.g., TT-394) that uniquely identifies that device within the plant 10 and may also be displayed along with a graphic meter or gauge (i.e., the partially shaded semi-circular features) that enables a user to quickly determine the status of the sensing parameter associated with that device. For example, the GUI may display a graphic meter or gauge associated with a temperature transmitter and may shade more or less of the meter based on the temperature currently being sensed by the temperature transmitter. Importantly, status information, here shown as one or more index values (performance, health, variability, utilization), may be displayed for one or more of the devices shown within the area 100. By way of example only, health index values for several of the devices that are connected to a tank 110 within the area 100 are displayed. However, more or fewer health index values could be displayed if desired. Additionally, different status information may be displayed for any of the devices that appear within the area 100 as desired. As can be appreciated from the display shown in FIG. 3, a user can quickly ascertain whether an area is performing properly and will continue to perform properly. Further, a user can also quickly identify those devices, units, sub units, etc. that may need attention and/or which may be causing a particular problem.

It will also be understood that a user may view successively lower and lower entities within a plant and be provided status information about each of these different entities or views. Thus, for example, a user may look at a view of the plant and see status information for the plant. The user may then focus on one area, such as by selecting one of the areas within the plant view, and see the status information associated with that area. A user may use a mouse to click on the area (or other entity being viewed) or the associated alphanumeric identifier or, alternatively, may enter the identifier via a keyboard, to request a new window or a pop-up window to display status information for that area. Similarly, by clicking on units within the displayed area, the status information for different units may be viewed. Likewise, status information for loops, sub units, devices etc. may then be viewed by focusing in on these different entities from a view of an entity in which these lower level entities are located. In this manner, a user can quickly find the cause of a problem or potential problem at any point or level of the plant. Still further, the GUI may also provide textual messages within the graphical display shown in FIG. 3 or in some other display or page that indicate to the user current or potential problems, which may be related to the displayed status information or changes thereof. These textual messages may identify possible solutions to the problems which have been identified.

As discussed further herein, the GUIs presented by the user interface routines 58 may include many additional screens and information, including table forms of plant asset data information and search forms for searching plant assets for matching devices and the like. In accordance with the present application, the information presented to the user may be tailored based on historical, or profile, data.

Figure 4:
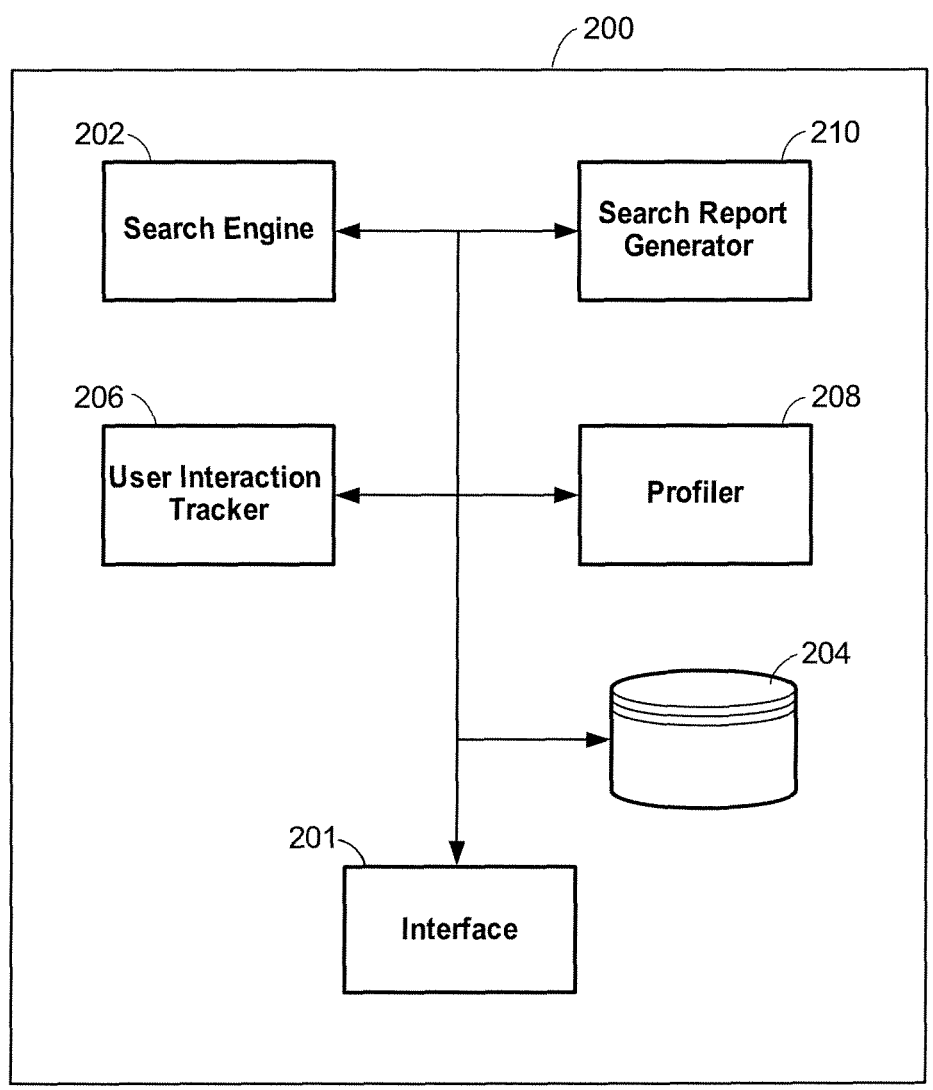
FIG. 4 illustrates a block diagram of an example implementation of the asset data and search reporter of FIG. 2.

To develop historical data, the asset data/search reporter 60 may include a number of functional elements. FIG. 4 illustrates a functional diagram of an example asset data/search reporter 200 that may be used as the asset data/search reporter 60 of FIG. 2. The reporter 200 includes a search engine 202 that executes a search routine through the user interface routines 58 to allow a user to search through plant asset data based on identified search fields. The search engine 202 in the illustrated example accesses plant asset data through an interface 201 in communication with the data sources discussed above with respect to the example of FIG. 2. For example, the search engine 202 may be in communication with control routines, an AMS™ or similar system, a maintenance system, models, control expert, optimizers, an asset management system, etc. The plant asset data (e.g., status information) may be stored locally within the asset data/search reporter 200 or in a storage medium accessible by the reporter 200. An example memory storage 204 is shown, however, and it will be understood that the memory storage 204 may be separate from the reporter 200.

A user interaction tracker 206 tracks user interaction with the user interface routines 58 to develop historical data reflective of which assets and asset data is more frequently referenced. The user interaction tracker 206 may also perform more complex trackings, such as tracking assets and asset data that is accessed in response to other assets or asset data. For example, the user interaction tracker 206 may track which assets a user views the status of when another asset reaches an alert condition. For example, if a process operator is advised an alert or urgent event on a particular device within a unit, then the tracker 206 may record whether the operator then begins manually checking additional devices within that unit (or process) to determine if they have been affected by the alert condition of the first device. Such correlated historical data could then be later used to provide another user with a smart tag listing correlated devices upon trigger of an alert on the first device. The tracking may occur internally with the system and automatically without interfering or altering the user's general system interactions.

Once the user data is tracked by the tracker 206 and stored, a profiler 208 accesses the developed historical data to automatically develop user preference data that may be used to personalize the reporting of asset data (status information) through the user interface routines 58. The profiler 208 may identify particular data for an asset as being high priority asset data and communicate that higher priority information to the user interface routines 58. The profiler 208 may analyze the historical data for higher priority data, at the device, unit, process, loop, sub-unit, or other level and then store that higher priority data for later presentation to the user. The profiler 208 may rank all asset data in this manner or just some portion of the asset data. The profiler 208 is designed to present personalized asset data during typical survey viewing of plant data. In the example of a search, user preference data developed by the profiler may be sent to a search report generator 210 that instructs the user interface routines 58 to present a search report that lists only a portion of all assets satisfying the search criteria and, in particular, those assets determined to be most likely desired by the searcher.

User interaction data may be tracked by the tracker 206 continuously whenever a user is interfacing with the GUI of the user interface routines 58, periodically, during operation by only some users, at the initiation of some triggering event a user's computer, or upon instruction from a remote computer, for example. The asset data/search reporter 200 may provide the user (e.g., through the user interface routines 58) a button that allows the user to select whether user interactions should be tracked during a particular session. The system may present the selection button at user login or system startup, after a given period of non-activity has occurred, upon a user attempting to access new plant asset data or to perform a new search, at the initiation of a remote system such as a business or maintenance system, or upon any other trigger event.

In some examples, the asset data/search reporter 200 may track user data, store that historical data, analyze that data and then offer the user the option of keeping that information for later usage or discarding. The asset data/search reporter 200 may thus allow the user to approve of the profile analyses. Furthermore, although analyzes are described below in an automatic configuration, it will be understood that the user may be presented with a preferences menu that allows the user to select which types of historical data are tracked and/or which types of tracked information are considered during analysis.

The reporter 200 is shown with certain functional elements. It will be understood that the reporter 200 may include additional functional elements not depicted, including for example an optimizer as discussed above.

Figure 5:
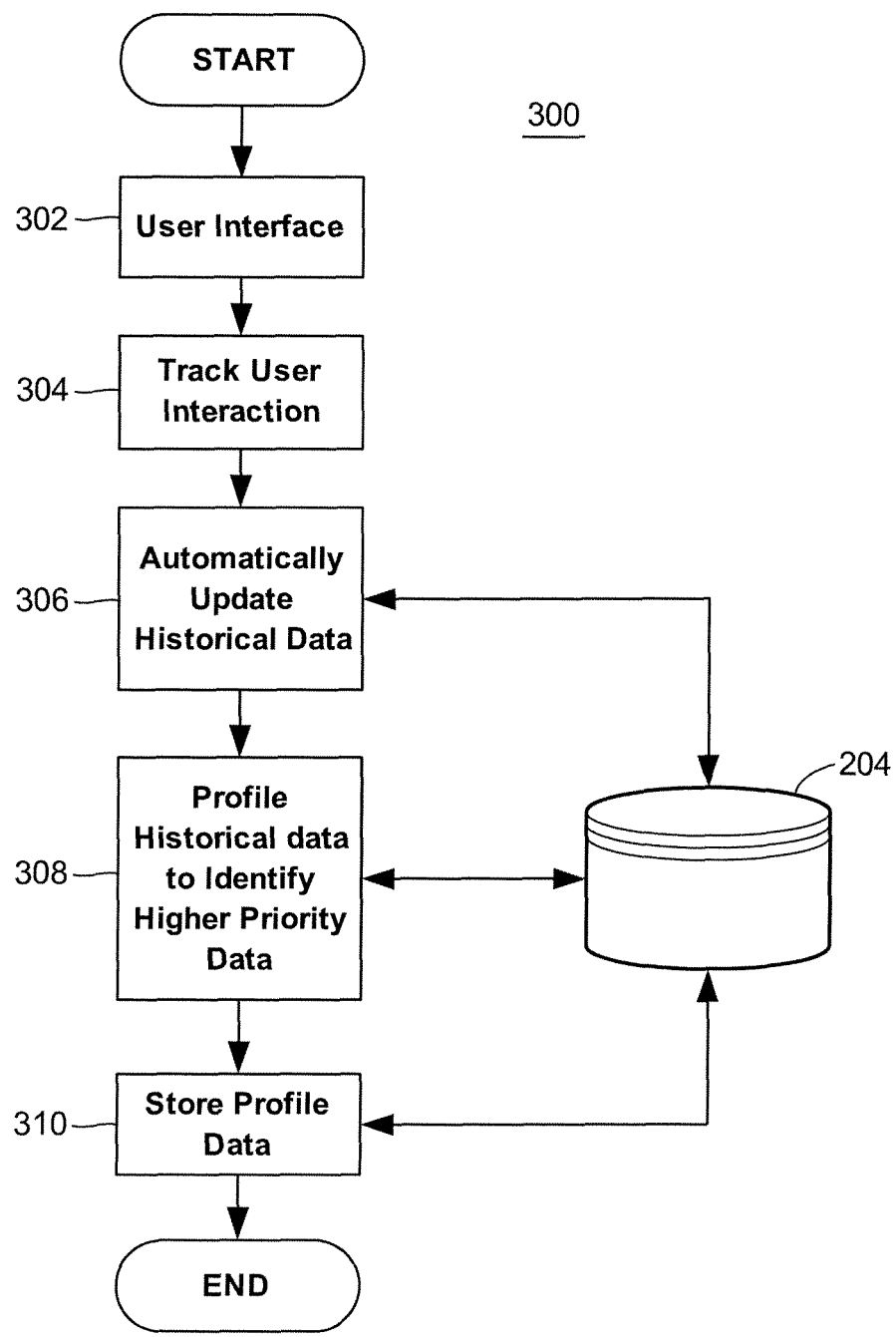
FIG. 5 illustrates a flow diagram of an example historical data collection that may be implemented by an asset data and search reporter.

FIG. 5 illustrates an example historical data collection technique 300 that may be implemented by the asset data/search reporter 60 or 200. The user interface routine presents a user interface 302 through which the user interacts to monitor, view, or search plant asset data. The user interaction tracker monitors user interactions through a tracker 304. The tracker 304 may track key strokes, button depressions, and the like which indicate that a user has selected a particular asset data, asset data screen view, tree, screen, tab, etc. The tracker 304 may track not only the action (e.g., data call request) but also the actually data responsive to that action. For example, if a user is presented with a screen listing a series of areas within a plant, the tracker 304 may record not only the act of selecting one of those areas, but also the particular area selected, and the assets corresponding to that area. Tracker 304 may track the number of times such information is accessed or called over a given period of time. The tracker 304 may track the amount of time a user spends reviewing particular types of information. For example, if a user or users spend a larger portion of their time viewing data pertaining to assets in an area B of a plant, then the tracker 304 may track the time spent reviewing area B assets.

A block 306 stores and/or updates historical profile data based on the tracked data from tracker 304. The block 306 for example may update a running database of plant asset areas and a running tally of the time over which a user is accessing information pertinent to that area, stored in a the storage 204. This running database may be constantly updated as new tracked information is obtained. The historical data is then accessed by a block 308, which in the illustrated example is executed by the profiler 208.

The profiler 208 (through the block 308) may analyze, or profile, the historical data to develop personalized, prioritized subsets of asset data. Thus, while the system may under its normal course prioritize search results in the ordinary course of searching, e.g., asset data "priority," the profiler 208 produces a further, personalized prioritization of the search results as they relate to the interaction with the system. This prioritization is more dynamic and user specific as it relates to the relative importance of the asset data as that asset data relates to the previous profile of user interaction with the system.

The asset data in general includes status information on assets. The personalized subset may represent higher priority information within that status information, higher priority in that the asset data/searcher 60 has determined that the subset is likely to be more pertinent to the user or particular user request (e.g., a request to view plant asset data or entry of search criteria to automatically generate responsive search criteria) than other status information that would otherwise be responsive. This higher priority status information may be presented to a user when the user accesses a particular type of plant asset view. For example, if the user accesses a particular area within the processing plant, then the profiler 208 may analyze the historical data from block 306 to identify which information in that particular area is most likely to be viewed by the user based on past historical performance. The profiler 208 may present the personalized asset data only in response to certain user interactions. For example, the profiler 208 may only present personalized asset data in more macroscopic views, such as at the area level, process, or unit level, where not all of the asset information may be deemed necessary, at least initially. In contrast, when the user selects a specific asset to focus in on, the profiler 208 may be instructed not to present a reduced set of the status information, but rather present all of the asset data. Although in some examples, the profile may personalize the report of status information on a single asset, to include only that information fitting an automatically generated user preference profile.

The process 300 ends with the profile data being stored by a block 310 at the storage 204 for later access by the asset data/searcher 200, and more specifically the profiler 208, to control the personalization of the display of plant asset data on the user interface routines 58.

Figure 6A:
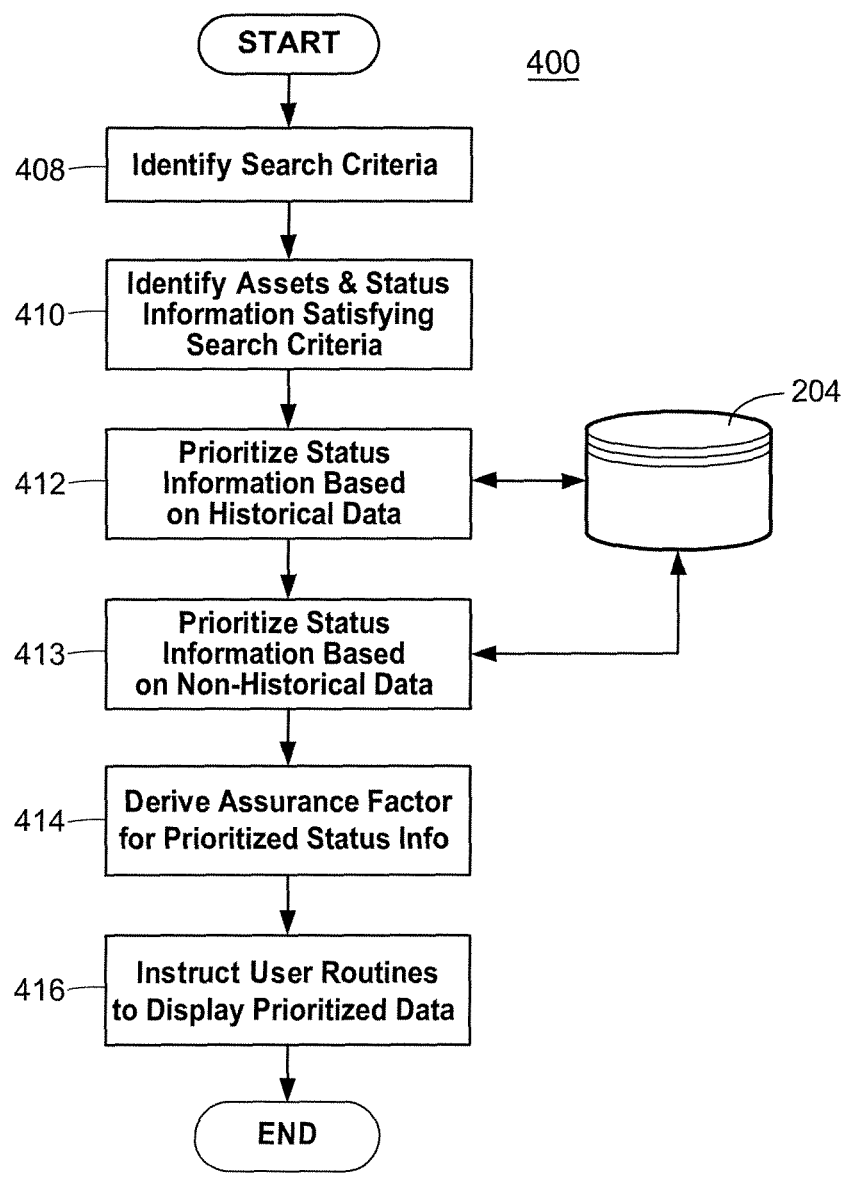
FIG. 6A illustrates a flow diagram of an example process that may be executed by an asset data and search reporter to automatically provide search reports to a user.

The above description provides an example technique for developing historical data to be used in profiling a user interaction with the user interface routines 58. FIG. 6A illustrates an example process 400 that may be executed by the asset data/search reporter 200, and more particularly the search engine 202 in communication with the search report generator 210, to automatically provide a search reports of predicted search parameters developed in response to past search criteria targeted by the user. To facilitate discussion, reference is made to FIG. 7 which shows a sample GUI input screen 402 that may be provided by the user interface routines 58. A search tab 403 has been selected and, as a result, the screen 402 has a series of search fields 404*a*-404*e* that may be populated by manually typing in text or by search field value from a pop-up window. Each search field may be associated with a different plant asset data (or status information), and while only five search fields are shown it will be appreciated that any number of search fields may be provided. Example search fields include the following listing, which is provided by way of example not limitation and is not exhaustive: health index, utilization index, variability index, performance index, a composite index of the same, alert state, urgent event state, maintenance status, last maintenance, next scheduled maintenance, calibration status, last calibration, next scheduled calibration, manufacturer, area, process, device type, loop, and other asset data as described herein and as will be understood by persons of ordinary skill in the art. Only certain example search fields are shown in the screen 403.

In the illustrated example a user has selected a health search value of 0-100 for field 404*d*, leaving the remaining search fields blank for now, with the exception of the global location search field 404*a*. The user interface routine 58 communicates that desired health value to the asset data/search reporter 60 which receives the identification at a block 408. A block 410 then accesses the stored plant asset data for assets satisfying the desired health value.

The data from the block 410 would include all assets satisfying the search condition in this particular example. The data is then passed to a prioritizer 412, which checks for stored historical data, such as that developed from the profiler 308. If historical data exists the prioritizer 412 prioritizes the data from bock 410 based on the priority information in the stored historical data. This historical data may be device, unit, area, or process specific. In some examples, the historical data may differentiate between assets based on other identifiers. The prioritizer 412 provides a prioritized reordering of the search result data from block 410 and, in the illustrated example, passes that information to second prioritizer 413 which checks for other non-historical prioritizing criteria for possible further reordering or filtering of the data from block 412.

Figure 6B:
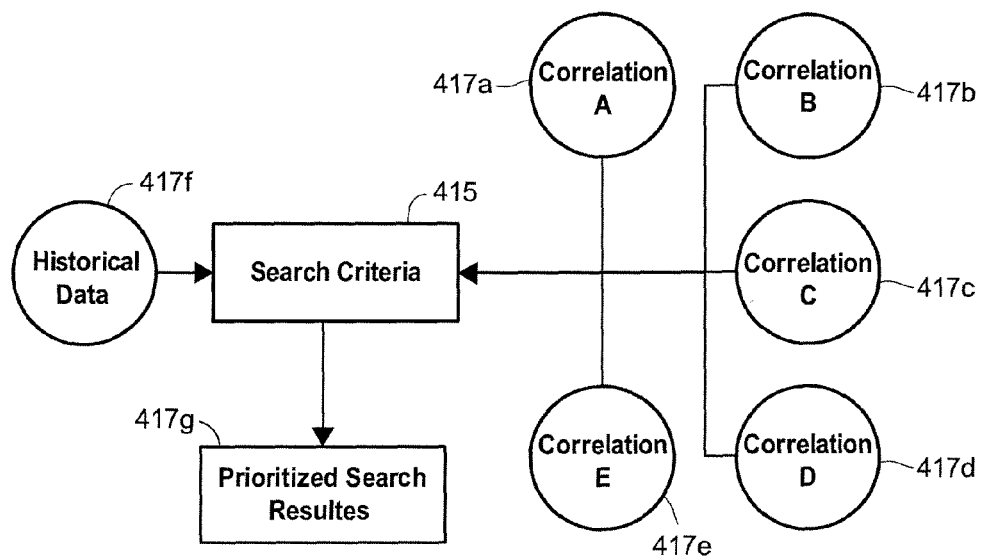
FIGS. 6B and 6C illustrate various correlation mappings for search reporters as may be generated by an asset data and search reporter.

For example, if the asset data/search reporter has previously correlated certain plant asset data with other plant asset data, the block 413 may identify that correlated asset data from the search result data of the block 410, and use that correlated data to further prioritize, reduce, or in some instances expand the search results affected by block 412. In this way, the system may develop a unique point of interest display for the user showing not only search results from correlated results that are identified by the system as also being of potential interest to the user. As discussed further below in regards to FIGS. 6B and 6C, a point of interest display may mark certain data sets or types of data based on historical usage for the user, such that each user's "point of interest" may be different as each user may interact with the system in a different role within the plant. Correlation based reporting operates as a point of interest system in which the search result input by the user centers the asset data/search reporter to a particular set of asset data or asset status information, and the reporter then determines of there are branches from that point of interest that reflect correlated data. FIG. 6B shows a status information or asset data mapping configuration in which a search criteria 415 inserted by a result has been previously correlated to a series of asset data criteria 417*a*-417*e* that represent non-historical data. The search criteria 415, for example, could be an index, alert status, or other asset data, and the correlated criteria 417*a*-417*e* could be any other index, alert status, or asset data that the system determines is related to the search criteria. Historical data 417*f* used by block 412 is also shown. All the criteria data from 417*a*-417*f* may then be used to produce prioritized search results 417*g*.

Figure 6C:
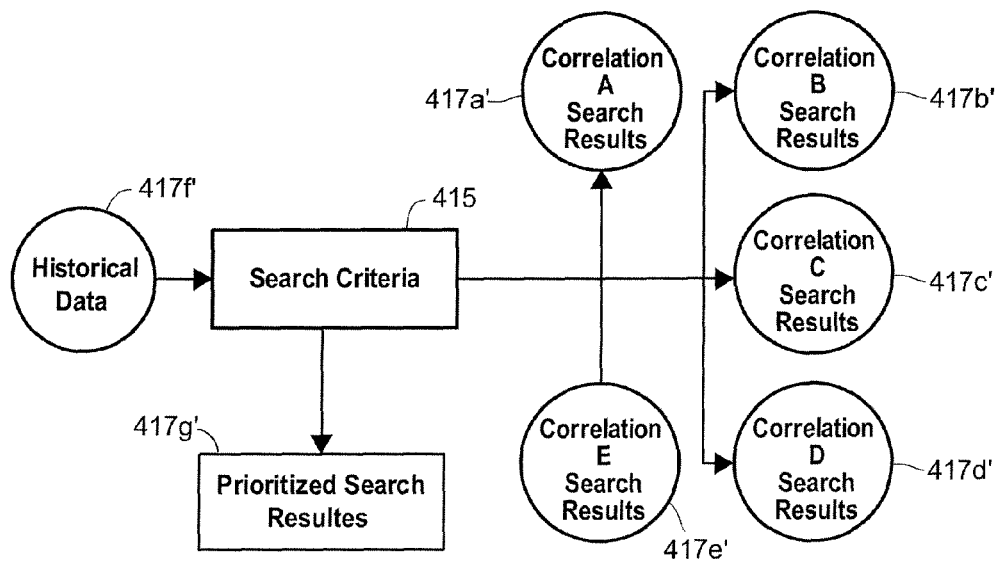

FIG. 6C shows a similar point of interest mapping to that of FIG. 6B, but where the prioritized search results 417*g*' are only based on the historical data 417*f*' used by block 412. In the configuration of FIG. 6C, instead of criteria 417*a*-417*e* being used to further prioritize the search results, elements 417*a*'-417*e*' actually reflect independent search results that when displayed to a user would display asset data correlated to the initial search criteria and/or search results 417*g*'. For example, search results 417*g*' could represent a personalized subset of all assets having a health index of 60-100, while element 417*a*' could assets having a performance index of 60-100, because the asset data/search reporter 60 has previously correlated the health index with the performance index, for example, when the two indexes have a similar linear regression as index values decline.

Non-historical, correlated search criteria could be of any sort, and the correlations may be based on time or location (plant wide, unit wide, area specific, etc.). Other correlations will be appreciated.

Data from the block 413 is provided to a block 414 that determines whether an assurance factor for the prioritized data is great enough to present only certain of the assets identified in the initial search of block 410. The block 414 may determine, for example, if the higher priority assets identified by the prioritizer 412 have a sufficiently high likelihood of being the desired search results that the other assets identified by the block 410 need not be presented in a search result. In such cases, the block 414 may store a copy of the fully prioritized asset listing from the block 412, but truncated to include only the highest priority assets, which data is then passed to a block 416 that instructs the user interface routine 58 to display search results 418 to the user, search results that may be reviewed with respect to different status information by selecting different tabs 419. If the block 414 determines that such a truncation should not occur then the full prioritized asset listing of block 412 is displayed to the user, shown in the shadow as 420.

Figure 8:
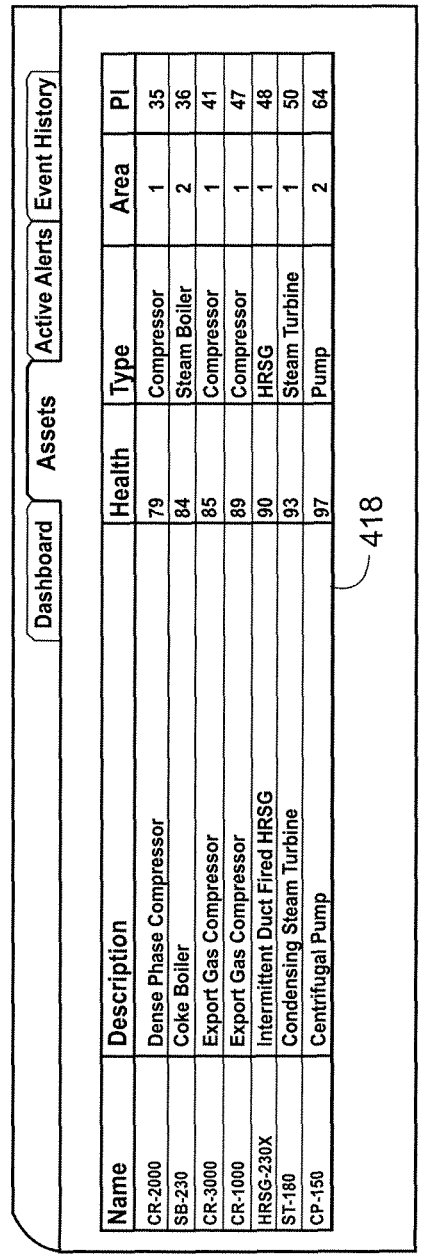
FIG. 8 illustrates another example graphical display of a personalized search report automatically generated by an asset data and search reporter in response to user search criteria, and showing a different historical data prioritization.

The search results 418 show a listing of assets having a health index between 0-100. That listing comprises higher priority assets (and corresponding status information) in a first portion 418*a*. The higher priority information in this example reflects a personalized search result in which the asset data/search reporter 60 has prioritize the search results to not only rank the assets based on their health index but also to identify a subset of the assets that pertain to a previously identified asset area of importance, in this case area 2, which past user searches or browsing has been identified as an area of particular interest in comparison to other areas. In the illustrated example, the higher priority status information is duplicated above the entirety of response search information, although as discussed above this need not be the case, and only the higher priority search information may be provided if desired. FIG. 8 provides an another example search listing 418 where the assets have been prioritized based on a profiled user preference for performance index (PI), where only those assets having a PI in a range identified by a profiler (e.g., between 0-65) as being a particular higher priority range are shown in the listing 418. For example, the profiler 208 may determine the range of PI for each of the most frequently accessed assets and determine if the closeness of the PI ranges are statistically significant enough to identify PI as an available prioritizing variable.

FIG. 9 illustrates another example of a personalized search, in which an asset data/search reporter has identified that the users (or the requesting user) historically view a particular type of plant asset, in this case pressure transmitters, more frequently than another type of asset, in this case valves. As a result, the more frequently viewed asset is prioritized in response to a user search request for assets that have a criticality value of between 60-100. That is, the search criteria instructs the asset data/search reporter to only indicate assets having a criticality range of 60-100, but the report results are sorted according to the historical views of the resulting data. The illustrated report shows that of the asset data having the identified criticality, user preference data has indicated that pressure transmitters reflect higher priority status information. The illustrated report also shows responsive lower priority status information (valve data), although in other examples such data may be exclude. The historical view data may be user specific, based on particular user viewing patterns or the historical view data may be based off of all user viewing patterns and thus, in this way, be specific to the asset itself.

Figure 10:
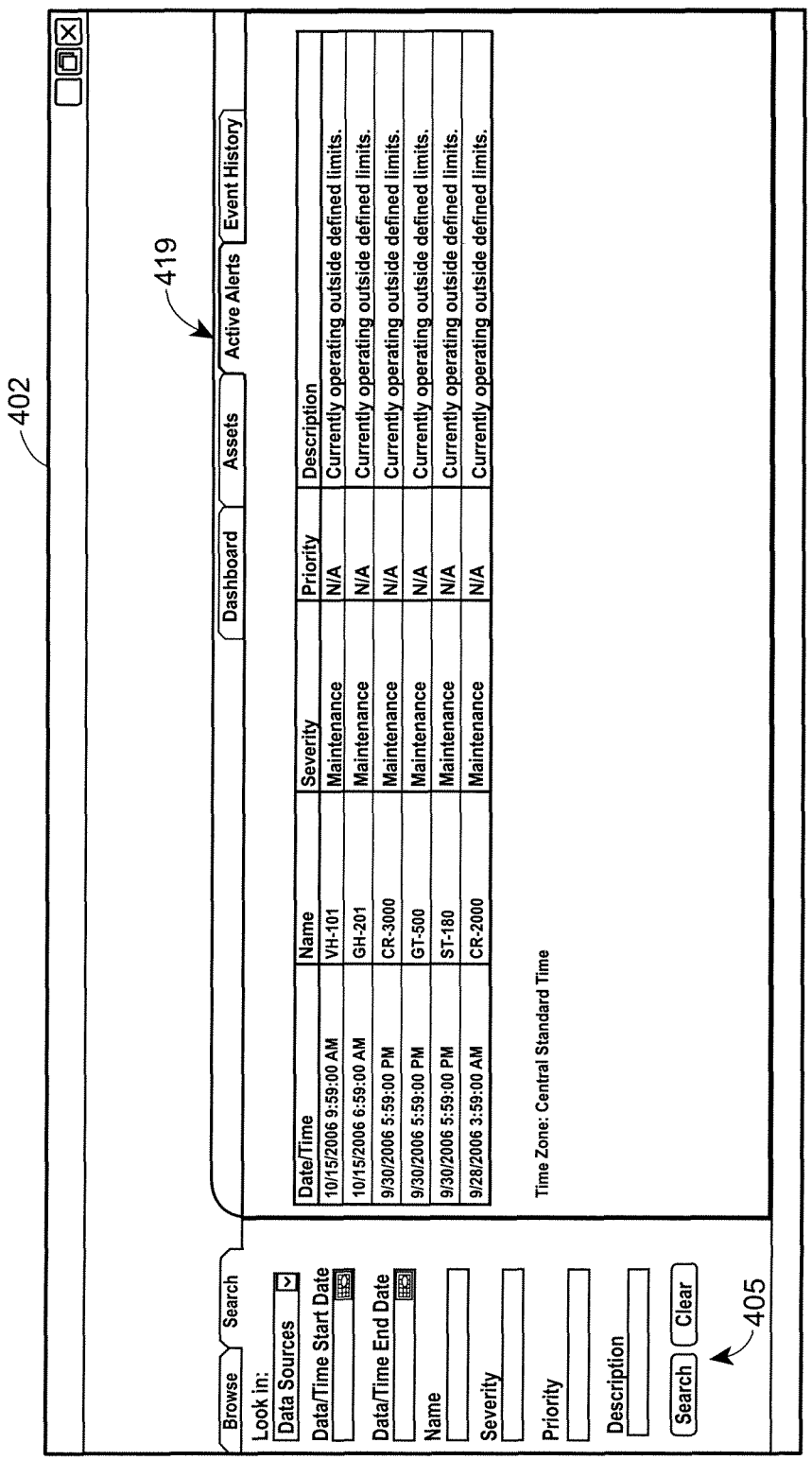
FIG. 10 illustrates another example graphical display of a personalized search report automatically generated by an asset data and search reporter in response to user search criteria and showing different asset information from that of FIGS. 7-9.
Figure 11:
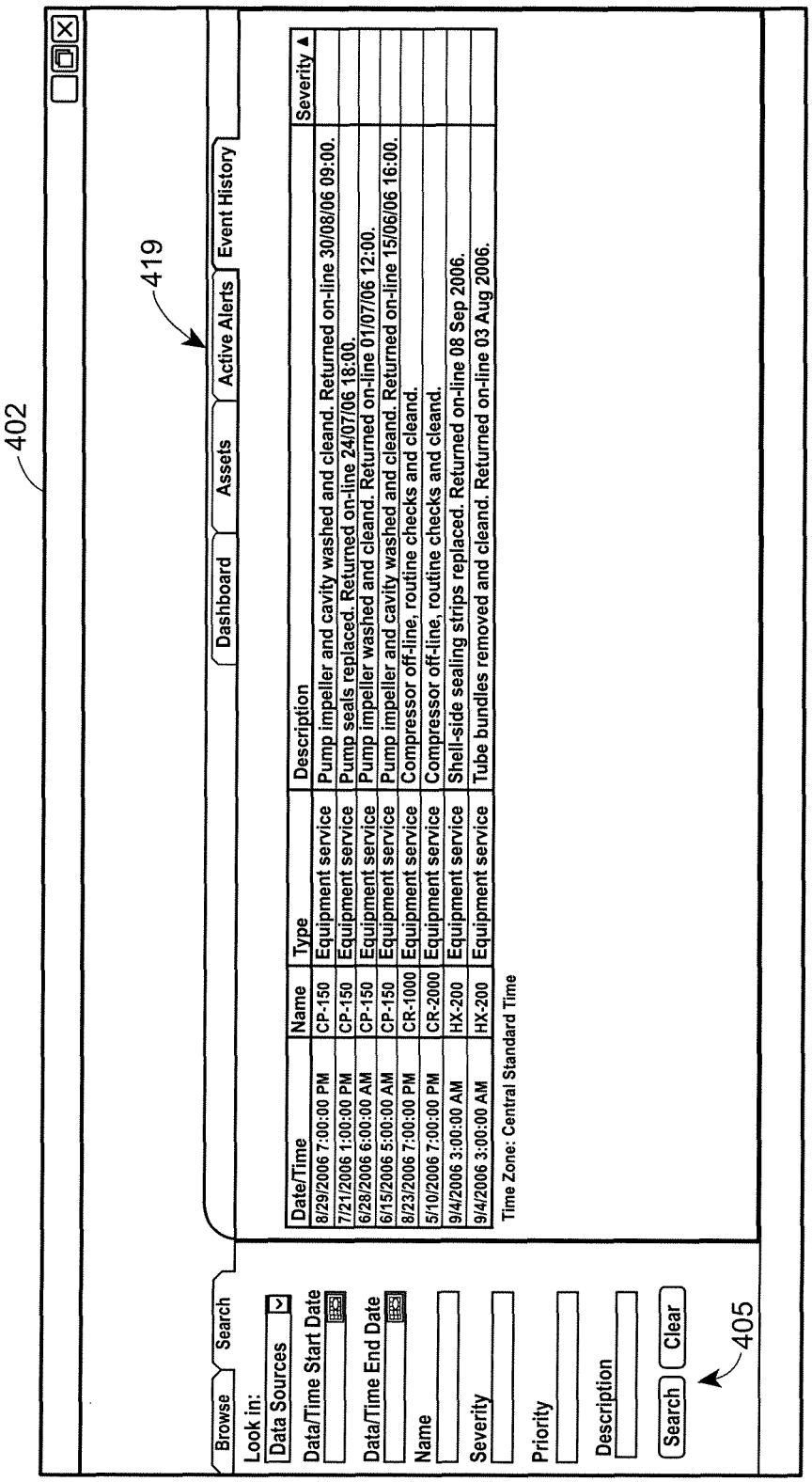
FIG. 11 illustrates another example graphical display of a personalized search report automatically generated by an asset data and search reporter in response to user search criteria and showing different asset information from that of FIGS. 7-10.

Other status information on the assets may be presented to the user, again in a personalized manner based on user preferences automatically derived from historical data, by selecting different ones of the tabs 419, as shown in FIGS. 10 and 11, showing search results narrowed down by active alert status, and search results narrowed down by event history. Each of the tabs may correspond to a predetermined set of conditions, e.g., active alerts may personalize the general search results by prioritizing them based on those assets having a health index in the search range and alert status of "maintenance." The prioritizing of each tab, however, may be modified by the asset data/search reporter to prioritize information based on the user preferences automatically derived from the historical data. Furthermore, additional or fewer tabs may be added to the tab listing depending on identified user preferences. In fact, a tab may be added which would only contain predicted search results, based on profiled user preferences and listing only that status information automatically determined by the system to be of a higher priority to the user than other status information.

Figure 7:
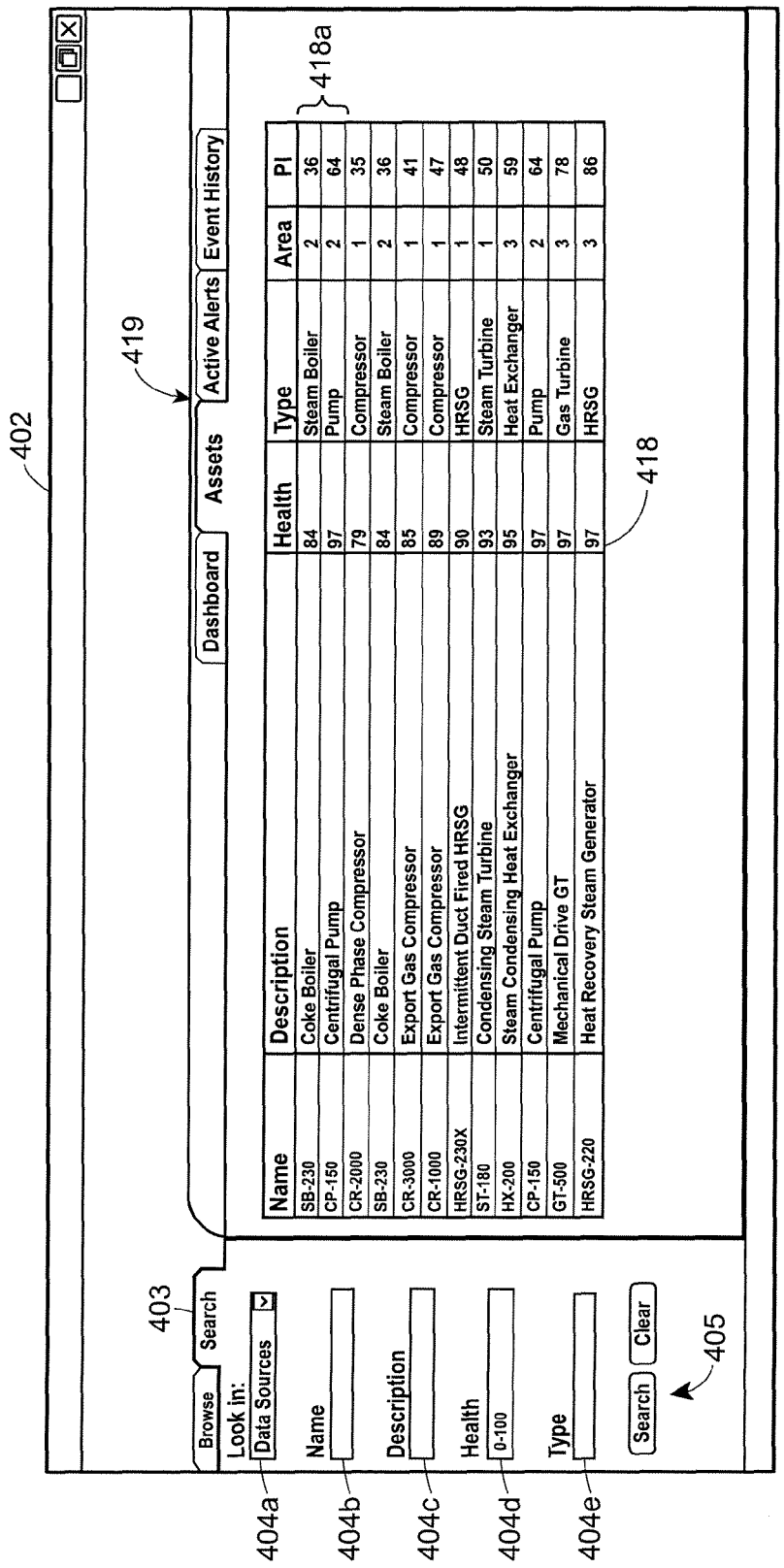
FIG. 7 illustrates an example graphical display of a personalized search report automatically generated by an asset data and search reporter in response to user search criteria.

FIGS. 7-9 illustrate merely some example implementations of a personalized search result presented by the user interface routine 58. Other implementations may be achieved as will be understood. Furthermore, while FIGS. 7-9 illustrate search results where one or two variables are used prioritize the predicted listing, any number of profile variables may be identified by the blocks 412 and 414 and used to prioritize information. This may be particularly helpful for search results that contain large numbers of assets. FIG. 12A illustrates an example search report 500 where assets are ranked based on plant area (with plant area B having a higher priority than plant area A). The assets within each plant area are further prioritized based on the current health index provided by an asset management system. Further still any assets having the same health index have been further prioritized based on their performance index. Thus, personalized search results of any multi-dimensional manner may be provided by the asset data/search reporter.

In some examples, multiple preference data (such as plant area and health index) may be identified by the asset data/search reporter, but the report will not be able to prioritize search results in a multi-dimensional manner as shown in FIG. 12A. In those instances, the reporter may be programmed to select one of the preference data for prioritizing. For example, when multiple preference data exists in response to a particular search criteria, the system may prioritize among the preference data based on the frequency of the execution of the preference data. If there is preference data that is more frequently used than other preference data, that more-frequently used preference data is boosted for the information that is in direct relation to the criteria.

Additionally, in some examples the asset data/search reporter 60 may not only prioritize certain asset data information for later use, the asset data/searcher 60 may correlate particular asset data with other asset data, so that when a user chooses to look at asset data, correlated asset data may also be displayed to the user. Correlating asset data can be quite useful in a plant system having illustration software that presents multiple views as the user scans across plant data. In this way, the asset data/searcher 60 can create its own point of interest mapping to easily display all assets satisfying the main asset data value and the correlated asset data values. For example, a user may be viewing an active alert tab and need to see related event data for any events that occurred in the same general time frame as a searched for alert. Instead of having to switch to an event view, select a search, and then enter a time frame of interest, the asset data/searcher 60 may configure a mapping in which the alert severity and time fields (see FIG. 9) across assets (over the entire plant, a particular process, a unit, etc.) are correlated to the event time field in a search engine and the alert location fields are correlated together. So now, if a user later launches a search based on an alert from one unit indicating an alert time, all correlated assets having an alert over an alert time window may be automatically identified to a user. Correlated events may be identified based on the location of the alert event as well. In either case, the user may then select through the automatically identified assets for further assessment, thus providing the user with faster access to data that the asset data/search reporter 60 has identified as more relevant, or in this case correlative to relevant data.

Figure 12B:
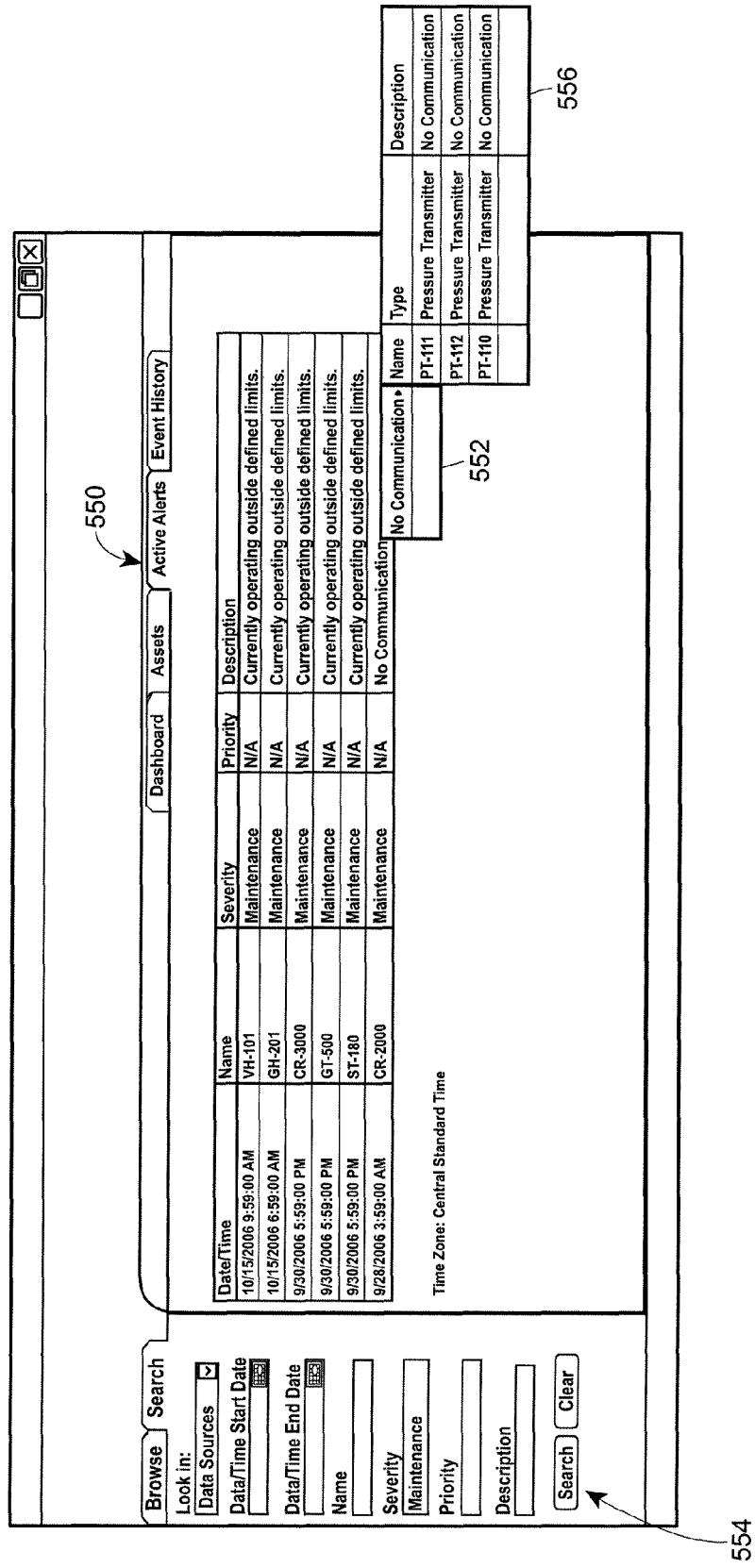
FIG. 12B illustrates a personalized search report where correlated asset results have been accessed through a smart tag automatically generated by an asset data and search reporter.

FIG. 12B illustrates an example smart tag application in which the illustration of FIG. 10 has been modified such that a report 550, produced by the asset data/search reporter, includes a smart tag 552 linked to those search results that bear a failure to communicate status in the description. The smart tag 552 is automatically generated and only in response to the reporter determining that historical data indicates a user preference for identifying assets that have a failure to communicate status. The reporter executes the search based on the search criteria indicated in a search field area 554, identifies the status information responsive to the search criteria, and then identifies whether historical data suggests that the search results should be prioritized based on user preference data. Additionally, the report determines if there is user preference data indicating that for some of the status information, the user is likely to prefer also seeing correlated search results, such as other assets having the same status information. The reporter may then generate a smart tag in the search field area 554, or the smart tag 552. Upon selecting the smart tag 552, the user may be presented with a secondary search report 556 showing of all assets having the failure to communicate status. In some instances the secondary report 556 may contain all assets having the status information flagged by reporter (i.e., the failure to communicate), or the reporter may report only an identified higher priority of those secondary search results.

An example of historical search data stored in a table form is provided below.

| DateTime | Criteria | View | Frequency |
|---|---|---|---|
| 2007-5-31 12:00:00 PM | Alert.Status = "No Communication", Asset.Priority >65 | Asset | 6 |
| 2007-4-21 2:00 PM | Event.Type = "Alert Active", Asset.Health >70 | Event | 12 |

In accordance with some examples, the asset data search reporter 200 controls which search field/smart tags are listed in search field/smart tag area 405. The particular search fields/smart tags may be personalized based on user preferences automatically identified by the profiler 208 of the asset data/search reporter 60. For example, only search fields/smart tags corresponding to higher priority information may be shown to a user. In other examples, the search fields/smart tags may be dynamic and change as a user selects a particular search field/smart tag. The asset data/search reporter 60 may identify search fields that correlate with one another, such as the health index and performance index or a health index and time since last maintenance. Thus, if a user is displayed a series of blank search field/smart tags and selects one of them that has a correlated search field/smart tag, then upon entry of a value in that first search field, the asset data/search reporter 60 may instruct the user interface routines 58 to display a correlated search field/smart tag for the user to complete, with the determination that the user may want to identify assets based on the correlated search field/smart tag as well as the primary search field/smart tag. Furthermore, each generated search field/smart tag may contain a popup listing of possible values that is automatically changed by the asset data/search reporter in response to automatically profiled user preferences. For example, the asset data/search reporter may modify the available values of a popup menu on a second search field/smart tag based on the value selected for the first search field/smart tag. If the first search field/smart tag to receive data is the health field, the asset data/search reporter may identify those performance index values associated with the select health field value. Problematically low health index values may be correlated with problematically low performance index values, such that the popup menu for a performance index may prioritize low ranges of performance index for the search field value when the health index search field has been populated with a low index range. The asset data/search reporter may modify the search fields/smart tags in similar ways with non correlated search fields/smart tags, but simply by identifying higher priority search field values (among the unselected search fields) based on the search field values already selected.

Figure 13:
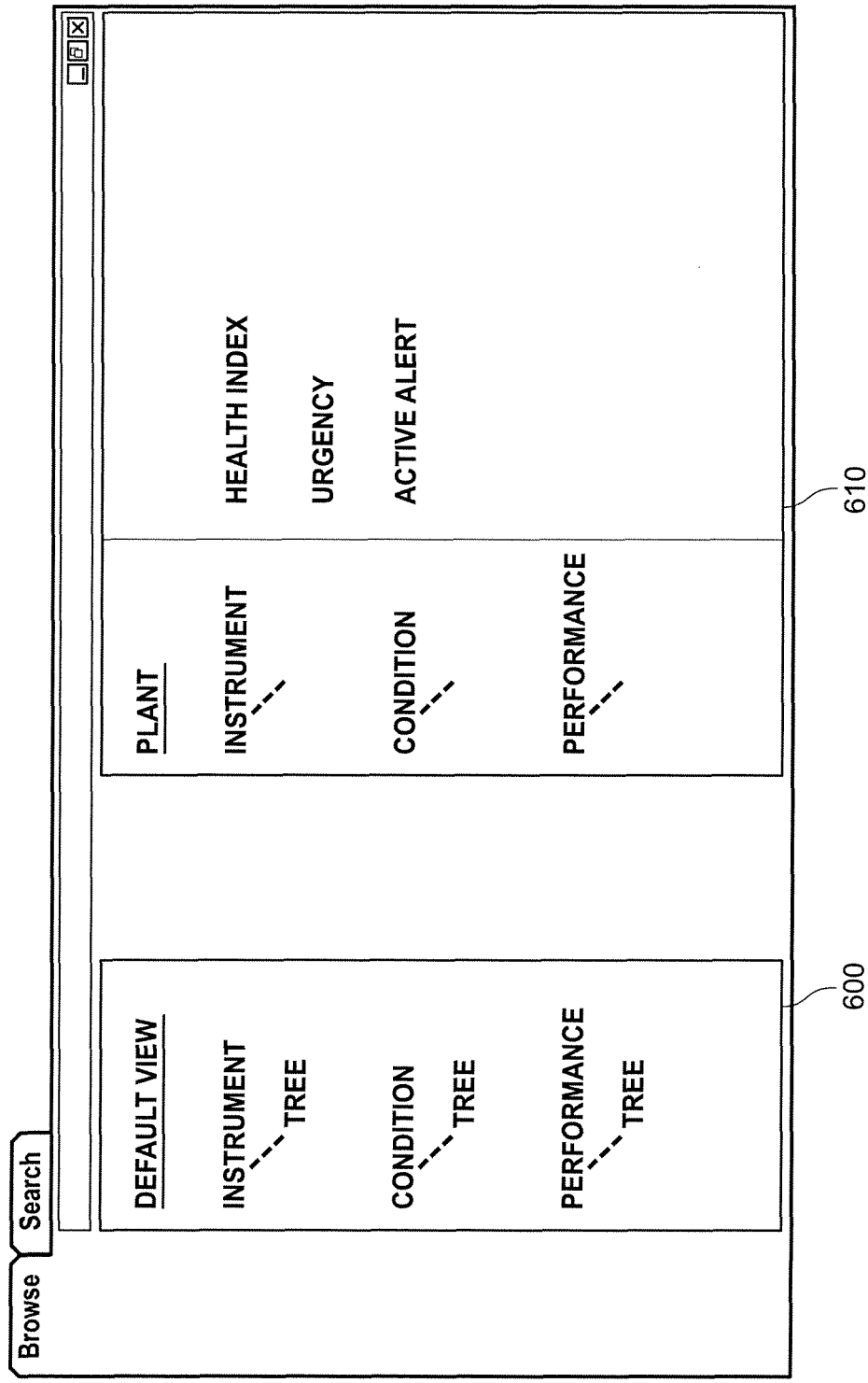
FIG. 13 illustrates an example graphical display that may be provided by a graphical user interface to enable a user to view reports regarding different levels within a process plant.

In addition to personalizing search results as discussed above with respect to examples of FIGS. 7-12, an asset data/search reporter in accordance with this disclosure may be used to personalize general browsing of asset data. FIG. 13 is an example depiction of a display that may be provided by the GUI to enable a user to browse among the various levels within the process plant 10 and report on various status information for the plant and any level thereof to provide consolidated reporting for all entities within the process plant 10. As shown in FIG. 13, a user is provided with a menu 600 of the various levels within the process plant 10. The menu 600 permits the user to easily navigate to view reports on status information regarding different levels and entities within the process plant 10, such as various devices, loops, units, areas, etc., including status information regarding the process plant 10 itself. The menu 600 may be arranged according to the types of information that may be viewed, the various levels within the process plant 10, or any other desired configuration. This configuration may also be user configurable. An expanded view 610 of the structure of the process plant 10 is also shown along with various status information, such as the overall health index of the process plant 10, the level of urgency associated with the health index, and alert information. Each entity and type of status information listed in the expanded view 610 may be arranged to allow a user to request further detailed information regarding that status information and/or entity. For example, the listed entities and status information may be user selectable icons, similar to a hyperlink in a web page, that link to another report featuring further detailed information associated with the selected entity or status information. In response to a user action or request (e.g., clicking on the link), the display of FIG. 13 may be replaced with the more detailed information, or alternatively, a new window may appear reporting on the further detailed status information regarding the selected level of the process plant 10, including any of the various devices, loops, units, areas, etc. The asset data/search reporter would tailor this detailed status information by prioritizing the assets responsive to the requested listing based on historical data analyzed by the reporter, where such historical data contains tracked user preference data representing past user interaction with the system, as discussed above.

Figure 14:
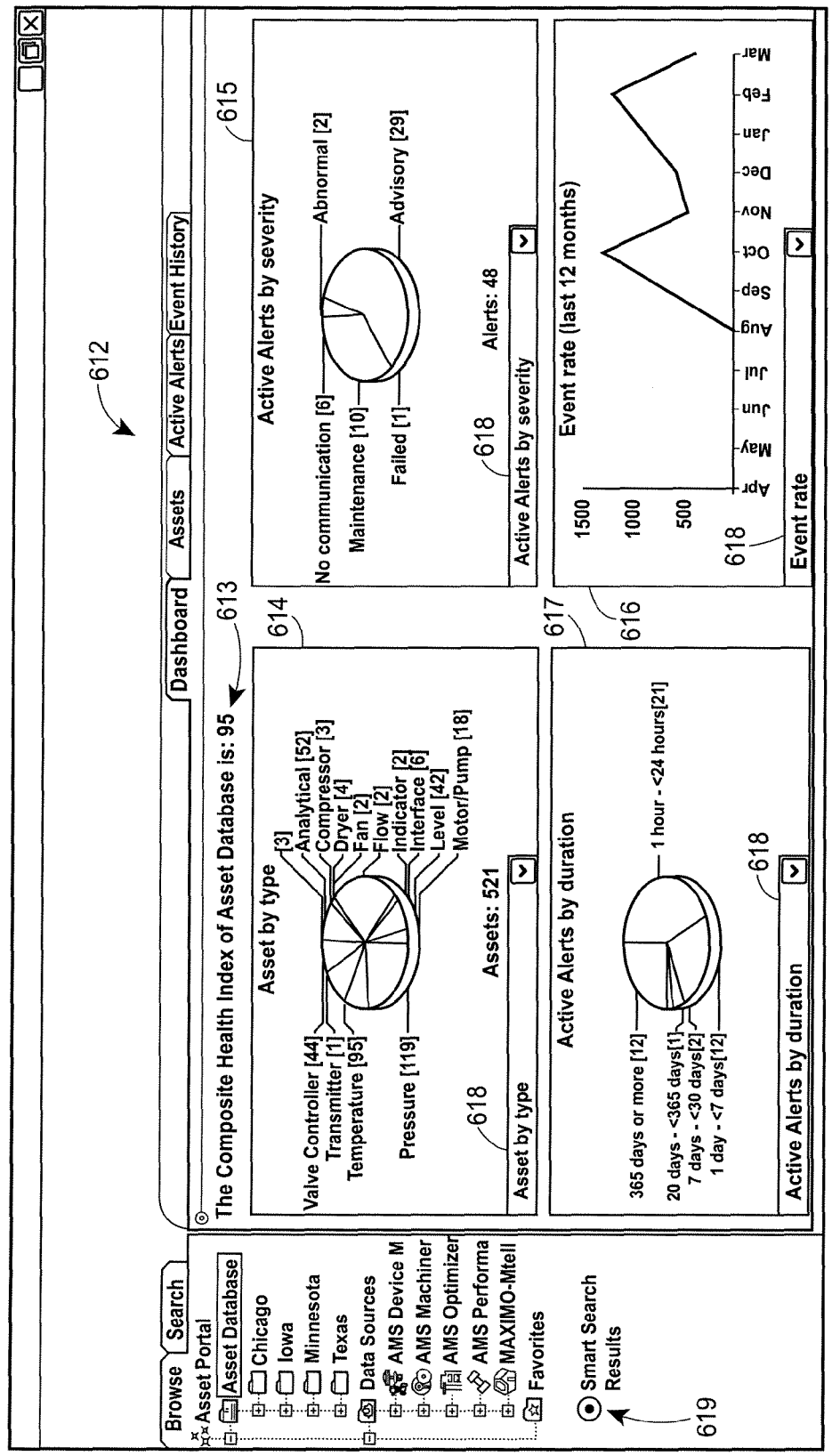
FIG. 14 illustrates an example graphical display depicting personalized search report asset data in various graphic forms.
Figure 15:
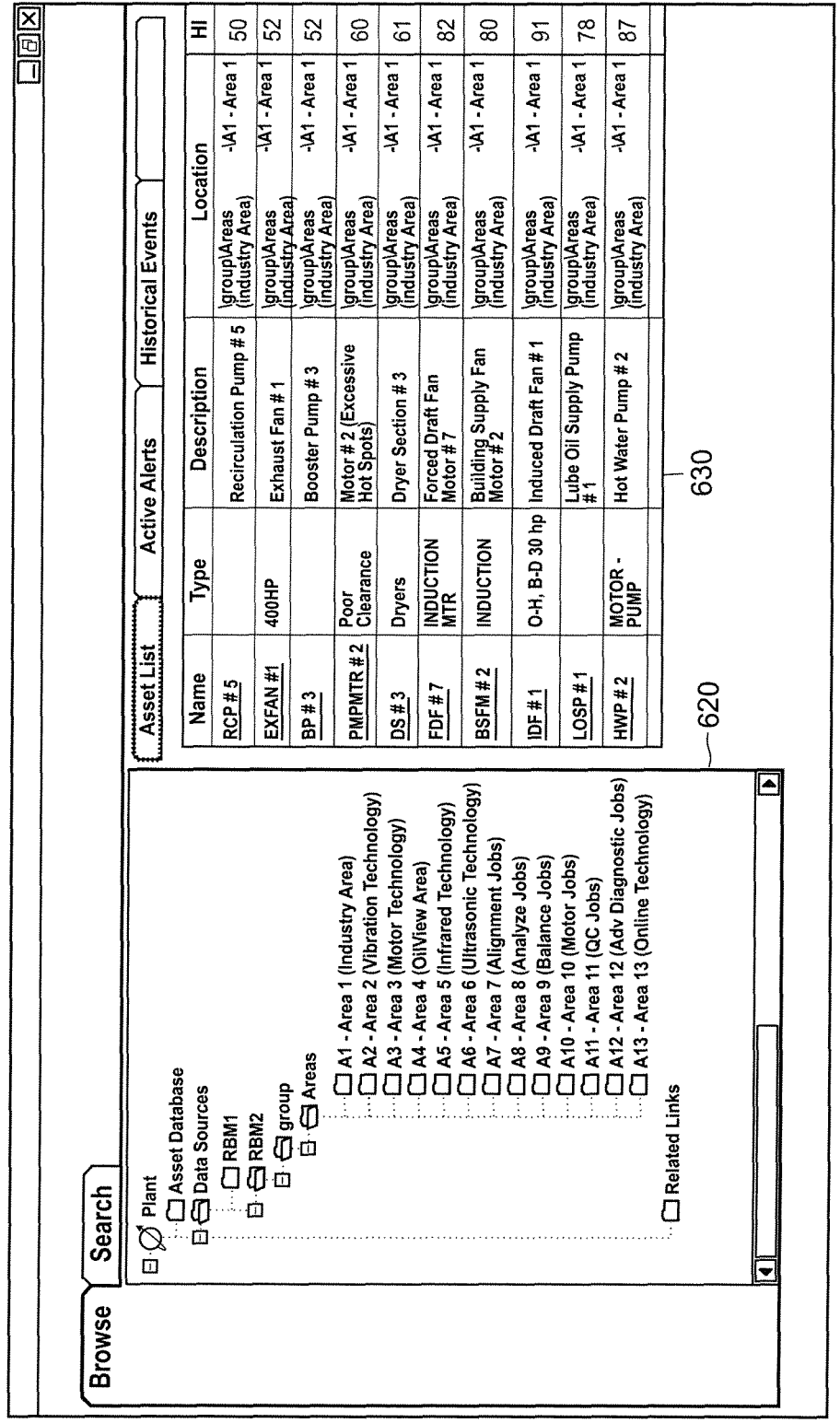
FIG. 15 is an example graphical display that may be provided by a graphical user interface in response to the asset data and search reporter to enable a user to view status information of lower level entities within a higher level entity.

In addition to personalized reports such as those described above, an asset data/search reporter may present search results in a graphical form, an example of which is illustrated in FIG. 14. Screenshot 612 illustrates a dashboard depicting the personalized historical search results produced by an asset data/search reporter in response to a search for assets having a health index of 95 as shown in a search results summary indicator 613. The search results are illustrated in four different graphical forms. Graphical plot 614 illustrates the search results (i.e., the assets with a health index of 95) by type and in a pie chart form. Graphical plot 615 illustrates the search results by alert severity, showing the number of assets responsive to the search results that currently also have an advisory, abnormal, failed, maintenance, or no communication alert status. Graphical plot 616 shows the historical rate at which particular events occur, in this instance the number of assets from among the total plant assets that have achieved a health index of 95 over a 1 year period. This type of illustration may allow operators to quickly assess the overall health trend of the entire plant or portion thereof. Graphical plot 617 is similar to graphical illustration 615 in that both further tailor the health index search results based on alert status. But the plot 617 depicts the number of assets having a health index of 95 and which have active alerts of various durations, from 1 hour to 24 hours, 1 day to 7 days, 7 days to 30 days, 20 days to 365 days, or 365 days or longer.

The graphical plots 614-617 are shown by way of example. The asset data/search reporter may illustrate personalized historical search results in other graphical forms. A selection box 618 is provided in each panel 614-617 to allow users to manually select the particular type of plot criteria.

The results shown in the graphical illustrations 614-617 reflect aggregate data of a subset of the assets responsive to the search request, in particular an aggregation of the subset identified by the asset data/search reporter as more relevant search results based on the identified ranking criteria, such as historical search data. In other examples, dashboard 612 may be present both this personalized aggregation of search results as well as the entire search results by manual selection of the user of a personalized searcher button 619 or other means.

FIGS. 15-20 are detailed depictions of the display described above in FIG. 13 in accordance with some examples. Each of FIGS. 15-20 includes a tree level view 620 of various levels within the process plant 10. In this particular example, the tree level view 620 is arranged according to the type of data sources that are made available to the user (e.g., AMS™ Suite: Machinery Health Manager data), which is subsequently arranged according to the various areas (e.g., Area 1, Area 2, etc.) within the process plant 10. This may be in response to a user request to browse additional monitoring, diagnostic and optimization information provided by the AMS™ Suite: Machinery Health Manager data source regarding the process plant 10 or a request to view this type of information for all areas within the process plant 10. However, the tree level view 620 may be arranged in any desired manner. The tree level view 620 may be arranged by various process plants 10 available to the user, by data source, by area, by unit, etc. Furthermore, the tree level view 620 may be personalized by listing the tree branches in a prioritized order, with the higher priority branches identified by the profiler listed first.

Alongside the tree level view 620 is a representation of further detailed status information regarding the selected area (e.g., Area 1). For example, in FIG. 15 a summary 630 of the units, loops, devices, etc. contained within Area 1 is shown with details regarding each unit, loop, device, etc. As with the tree level view 620, the summary 630 may be user-configurable to list various entities relating to, though not necessarily part of, the selected area. Furthermore, status information from various data sources may be included in the summary 630, as determined from the user preferences. Further still, the listing 630 is a prioritized browser listing with higher priority status information 632 listed first and lower priority status information 634 listed second. The priority ordering in this example is based on the health index which had been identified by a prioritizer as user preference data profiled from historical data representing past user interaction with the system. For example, an asset data/search reporter has tracked previous user interaction with the GUI interface like that of FIG. 13 and automatically determined that the user has a preference for browsing assets based on health information (e.g., because the user more frequently searched the performance tree based on the health index or searched the instruments tree for instruments having a certain health index). In response, the asset data/search reporter in reporting the assets corresponding to Area 1, lists the assets and corresponding status information in a prioritized manner with those indexes having a poor performing health index first, predicting that these assets would be of a higher priority interest to the user.

Figure 16:
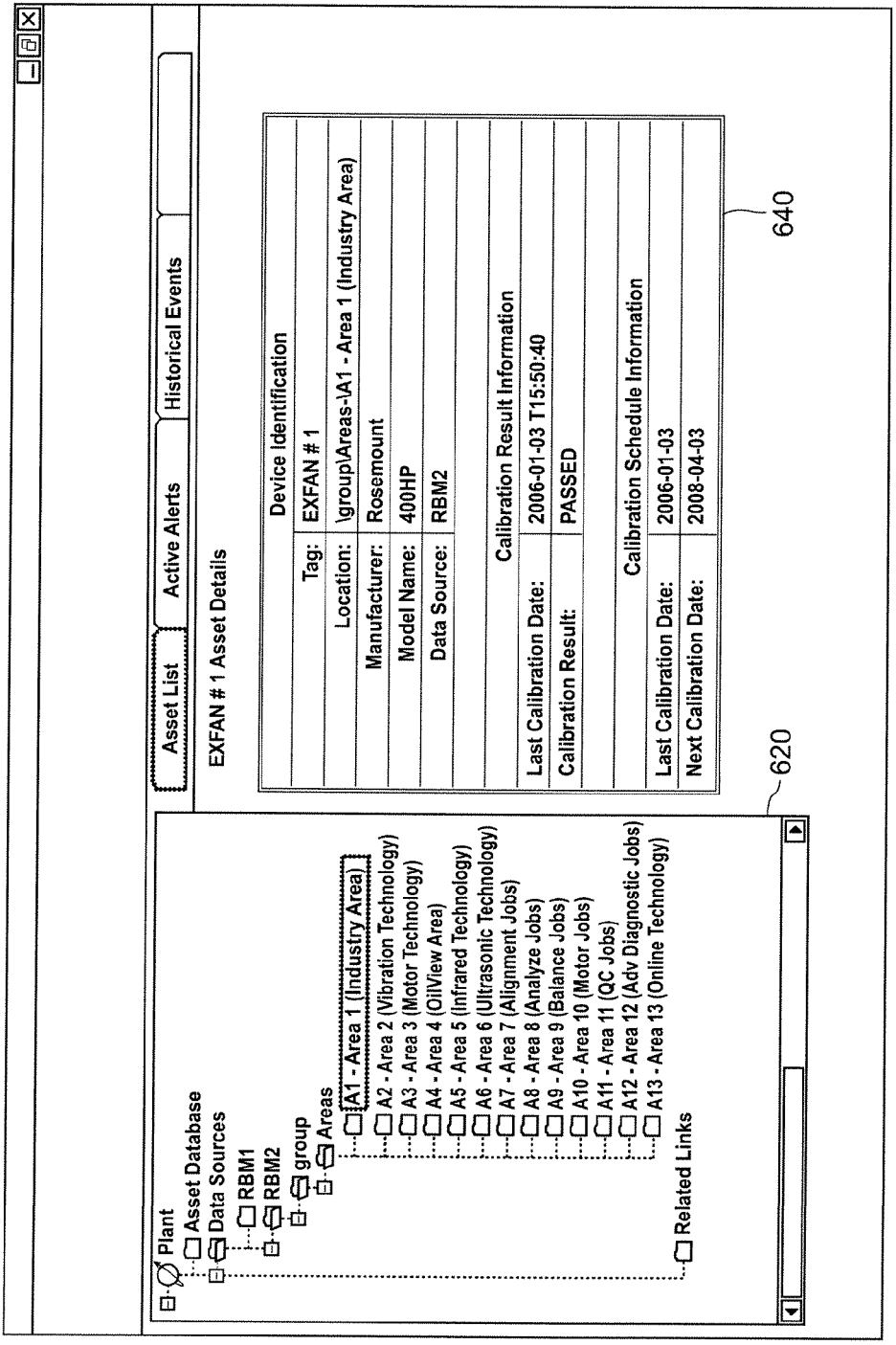
FIG. 16 is an example graphical display that may be provided by a graphical user interface in response to the asset data and search reporter to enable a user to view status information of a lower level entity.

Beyond this automatic prioritizing based on historical data, as described in U.S. application Ser. No. 10/390,818, entitled "Asset Optimization Reporting in a Process Plant", the specification of which is hereby incorporated by reference, each listed unit, loop, device, etc. may be user selectable to bring up even further detailed information regarding that entity, for example, by using dynamic links associated with each listed unit, loop, device, etc. In response to a user request (e.g. clicking on the alphanumeric identifier), status information regarding the details pertaining to Exhaust Fan #1 (EXFAN #1) may be displayed in a device summary 640 as shown in FIG. 16. Any or all details regarding Exhaust Fan #1, including identification information (e.g., name, location, manufacturer, model, data source), calibration status, configuration, efficiency, etc. may then be displayed in a separate window or in the same window. It will be understood that the particular status information being displayed is not limited to any particular type, amount or level of detail. Instead, as described more fully below, the information that may be displayed can vary according to a user's need and/or preference.

Figure 17:
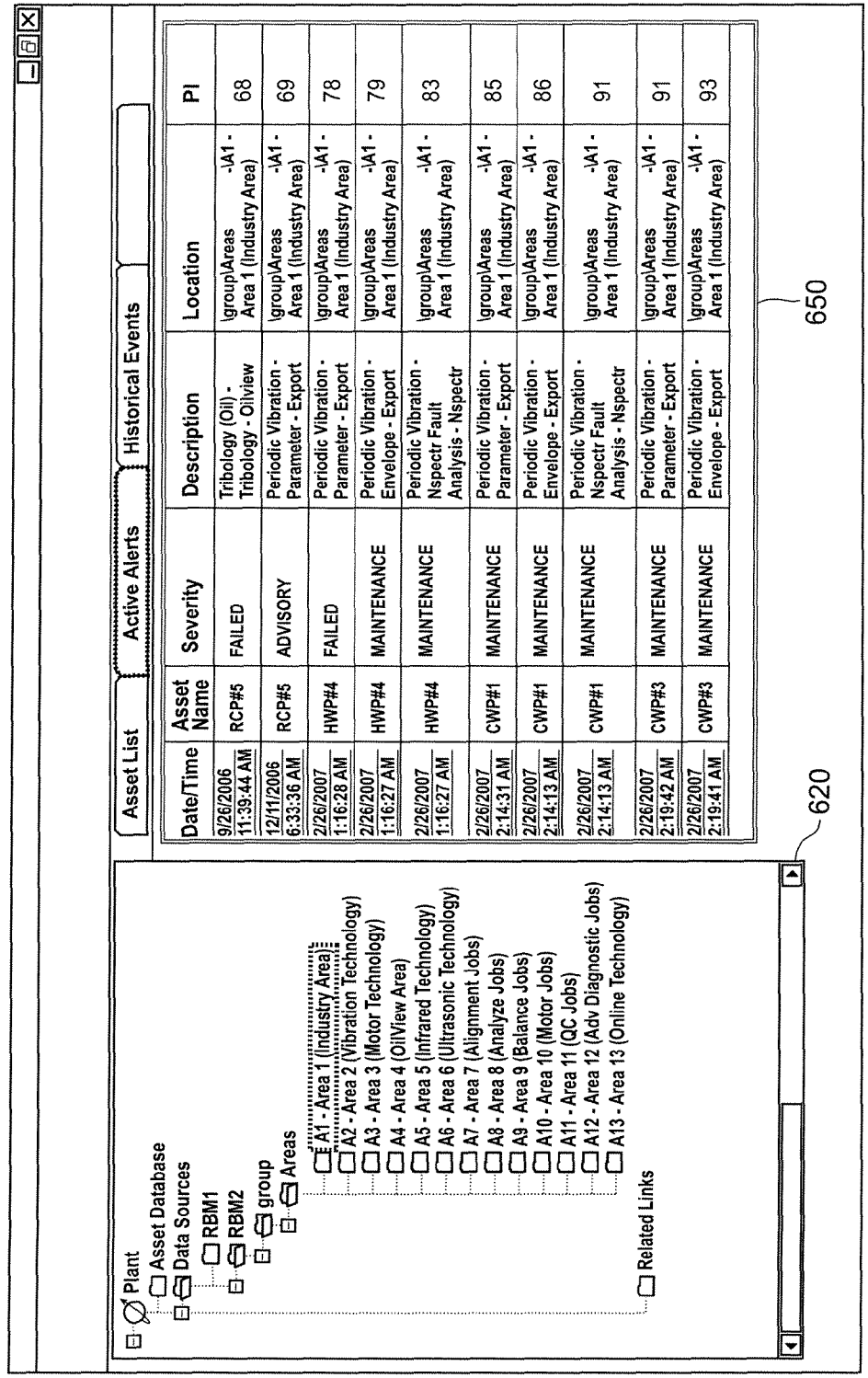
FIG. 17 is an example graphical display that may be provided by a graphical user interface in response to the asset data and search reporter to enable a user to view alert information.

Above the listed status information for Exhaust Fan #1 are more user selectable icons responsive to user actions which bring up further detailed status information. These user selectable icons (or "tabs") reflect summary views of available information and are arranged along the top of the display to allow navigation among further available status information. For each tab of the GUI of FIG. 15, selecting a tab may result in a prioritized listing of status information being presented to a user. For example, as shown in FIG. 17, a user may view all current alerts or events associated with Area 1 by selecting the "Active Alerts" tab. The resulting display 650 of active alert information may list each of the of the entities that currently have a problem, along with details regarding the alert such as the date/time, the unit, loop or device associated with the alert, severity of the alert, etc. The display 650 is prioritized based on performance index to identify a set of higher priority assets 652 first and a set of lower priority assets 654 second, where the asset data/search reporter has analyzed historical data of user interactions to determine, in this example, a user preference data identifying a desirability to see assets organized in ascending order of performance index.

Figure 18:
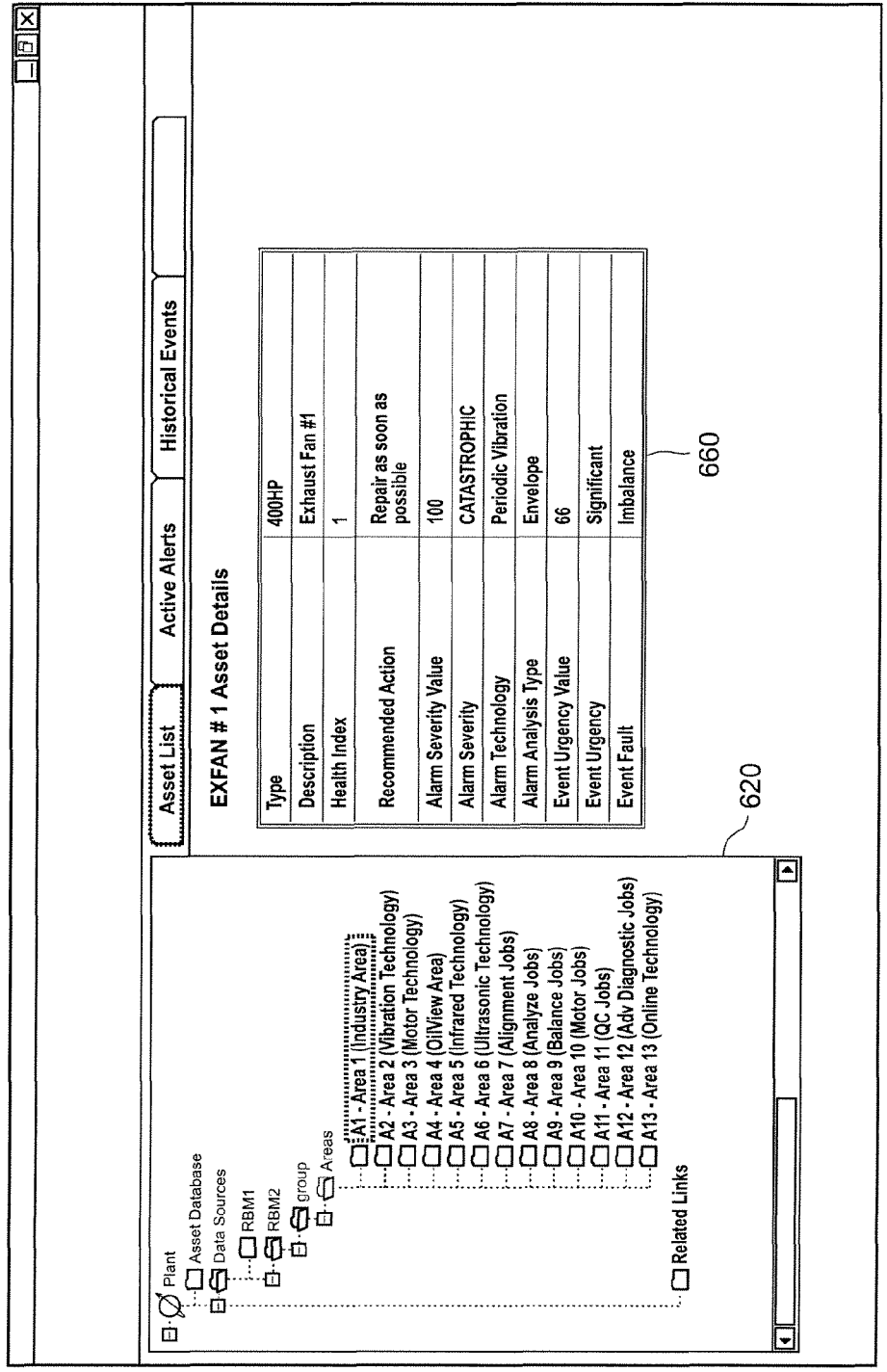
FIG. 18 is an example graphical display that may be provided by a graphical user interface in response to the asset data and search reporter to enable a user to view detailed alert information.

Any or all details regarding an active alert associated with an entity, (e.g., Exhaust Fan #1) may include status information such as type, description, health, alerts, etc., as shown in the display 660 of FIG. 18. The details may further include recommended actions to be taken given the status information (e.g., repair as soon as possible) along with explanations of or the degree of the current status of the asset (e.g., severity, urgency, etc.) and detected cause (e.g. event fault).

Figure 19:
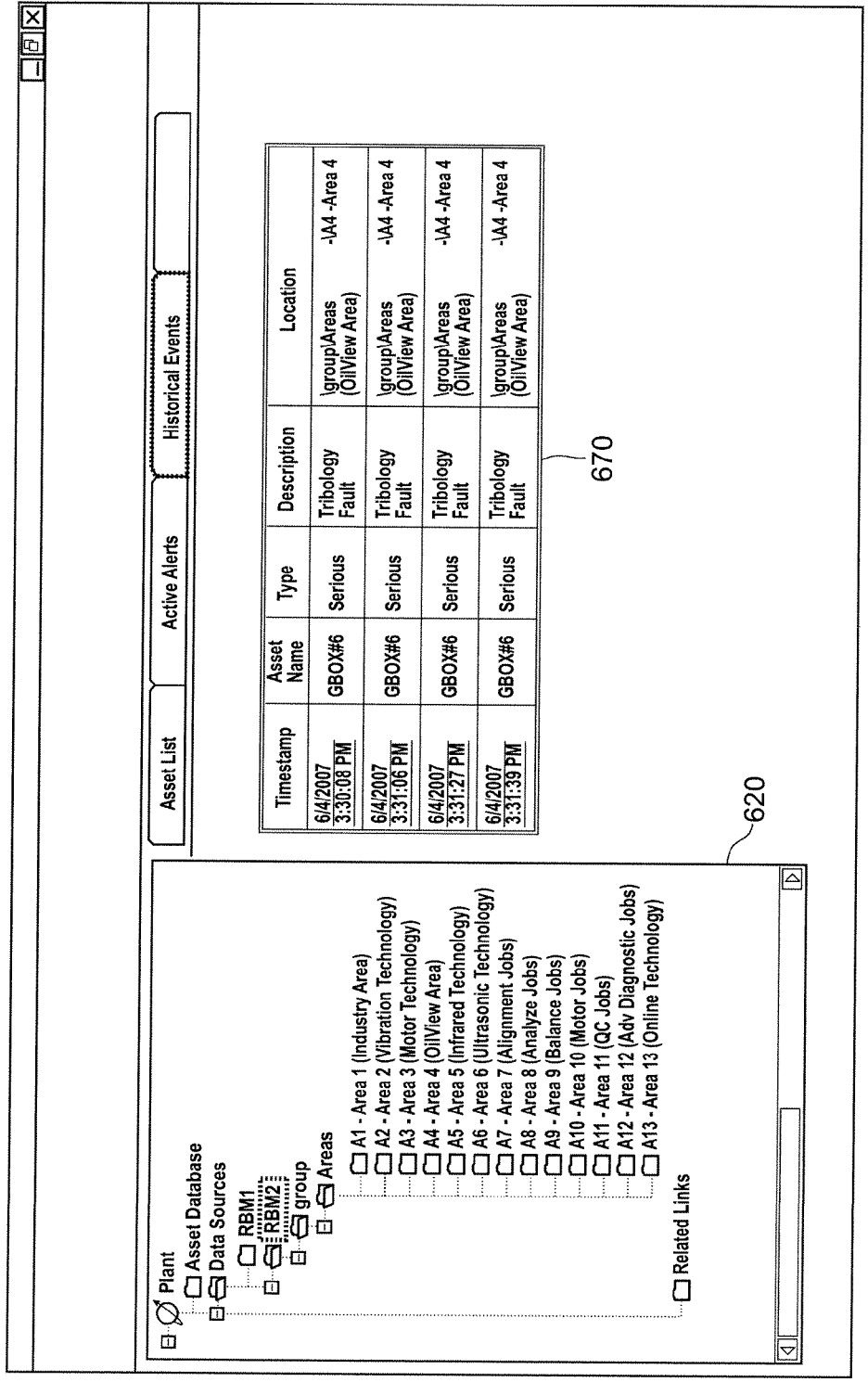
FIG. 19 is an example graphical display that may be provided by a graphical user interface in response to the asset data and search reporter to enable a user to view audit trail information of historical events.
Figure 20:
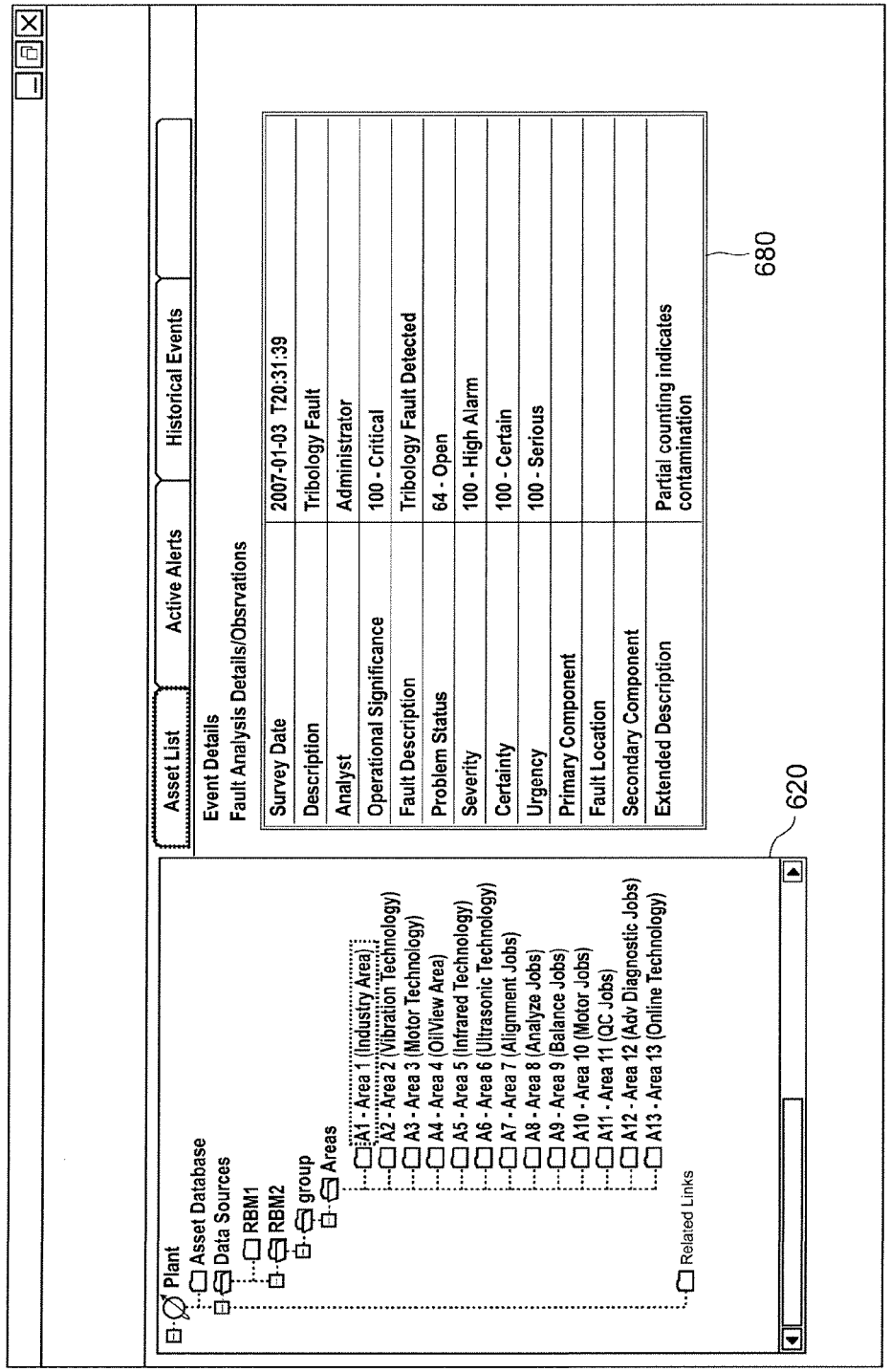
FIG. 20 is an example graphical display that may be provided by a graphical user interface in response to the asset data and search reporter to enable a user to view detailed audit trail information for a historical event.

As shown in FIG. 19, a historical summary or audit trail 670 may be displayed in response to a user request for "Historical Events". In this particular example, the history regarding a device (a gearbox denoted as GBOX #5) in Area 4 is displayed to allow the user to quickly assess the progression of the state of GBOX #4. The historical summary 670 may further be used to display a history of all entities within a given location, a history of a particular entity, a history of a particular type of fault, etc. Each historical entry may further be user selectable to display details regarding that particular event, as shown in the display 680 of FIG. 20. Examples of some of the details that may be listed include date and time of the event, a brief and extended description of the event, event significance, status, severity, certainty, urgency, location, observations, etc.

Figure 21:
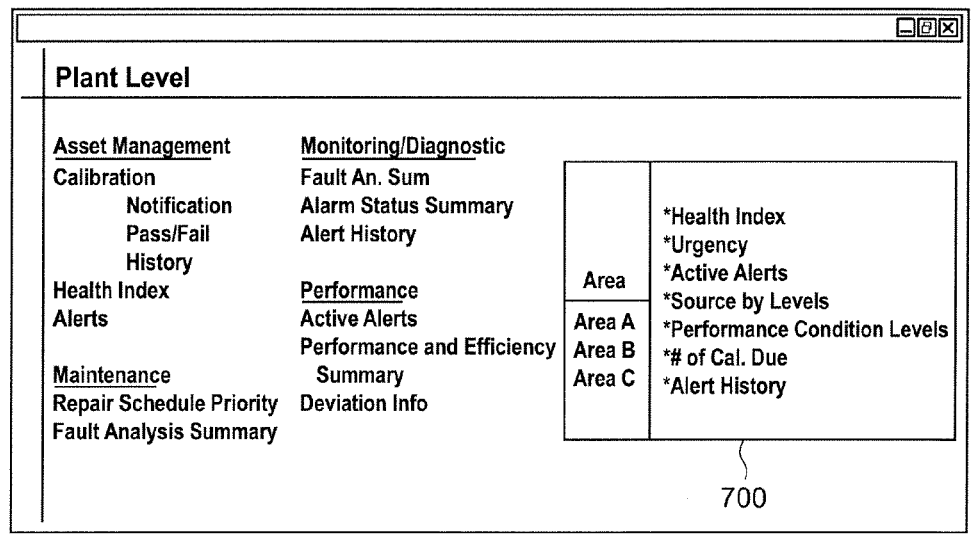
FIG. 21 is an example graphical display that may be provided by a graphical user interface in response to the asset data and search reporter to enable a user to view status information regarding a process plant.

FIGS. 21-25 are further example depictions of displayed reports that may be provided by a user interface routine in response to a user request to view further reports of details for different types of status information at various levels of the process plant 10, and under the control of an asset data/search reporter. For example, in response to a user request from the display of FIG. 13, the GUI display of FIG. 21 may be presented. However, it will also be understood that the displays of FIGS. 21-25 may be presented in response to a user action from the displays in FIGS. 15-20, such as from the tree level views 620 or by a user action with a user selectable icon associated with the process plant 10, an area, a unit, a loop, a device, etc. from a GUI as depicted in FIG. 3. The GUI of FIG. 21 depicts available status information regarding the process plant 10. A menu of headings, each relating to a particular type of status information, facilitates navigation among various types of status information regarding the process plant 10 from various data sources. Examples of available status information regarding the process plant 10 includes status information from the maintenance system application 66 (e.g., calibration, alerts, etc.), the asset management tools 70 (e.g., alerts, alert history, repair schedules, etc.), the asset management system 50 (e.g., health index, performance, etc.) or any other desired data source. A smaller view of the display of FIG. 3 may also be provided as a summary window 700 within the display to facilitate navigation among the various levels of the process plant 10 and to display a summary of the status information related to the process plant 10. In this example, the areas of the process plant 10 are depicted in the summary window 700 to facilitate navigation to the various areas within the process plant 10.

Figure 22:
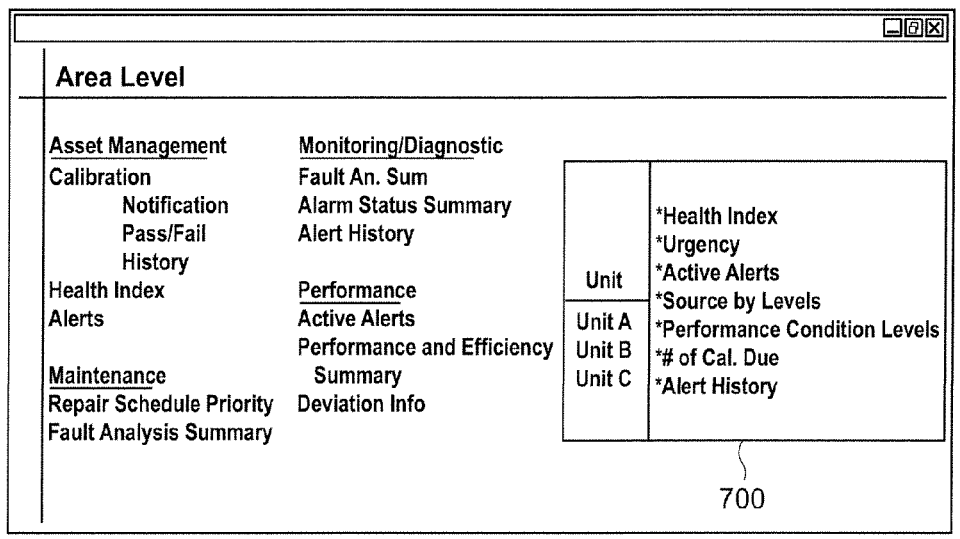
FIG. 22 is an example graphical display that may be provided by a graphical user interface in response to the asset data and search reporter to enable a user to view status information regarding an area within the process plant of FIG. 21.
Figure 23:
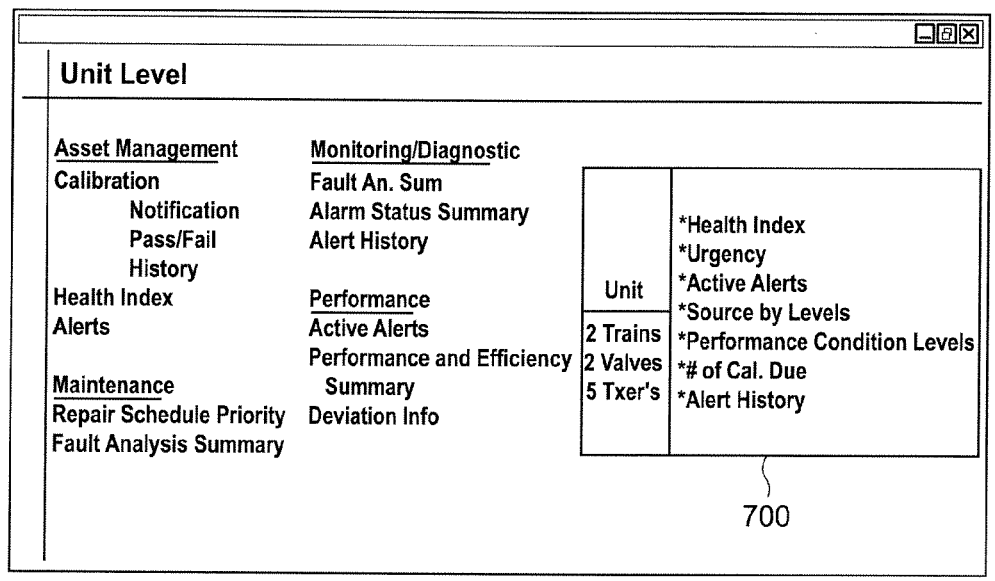
FIG. 23 is an example graphical display that may be provided by a graphical user interface to enable a user to view status information regarding a unit within the area of FIG. 22.
Figure 24:
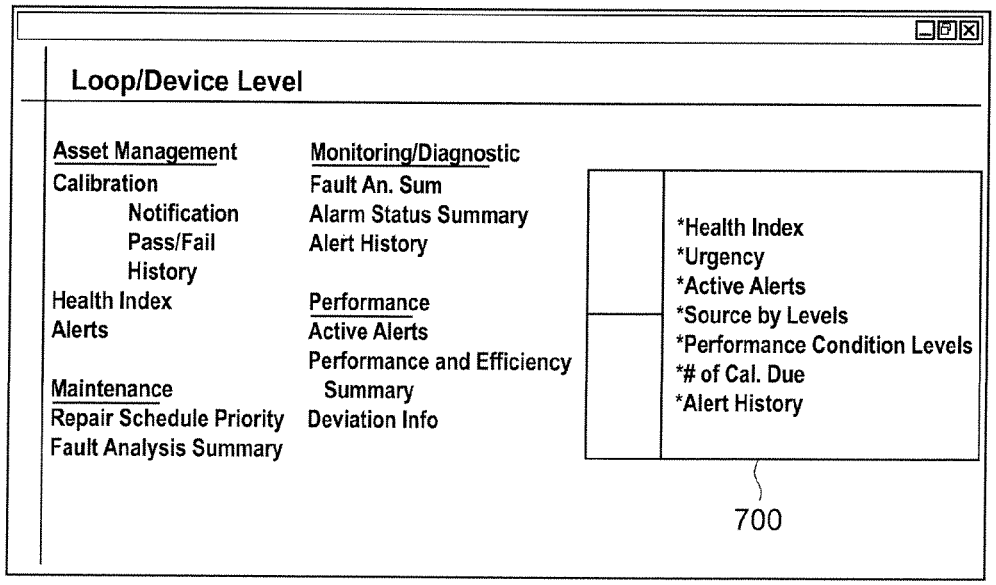
FIG. 24 is an example graphical display that may be provided by a graphical user interface to enable a user to view status information regarding a loop or device within the unit of FIG. 23.
Figure 25:
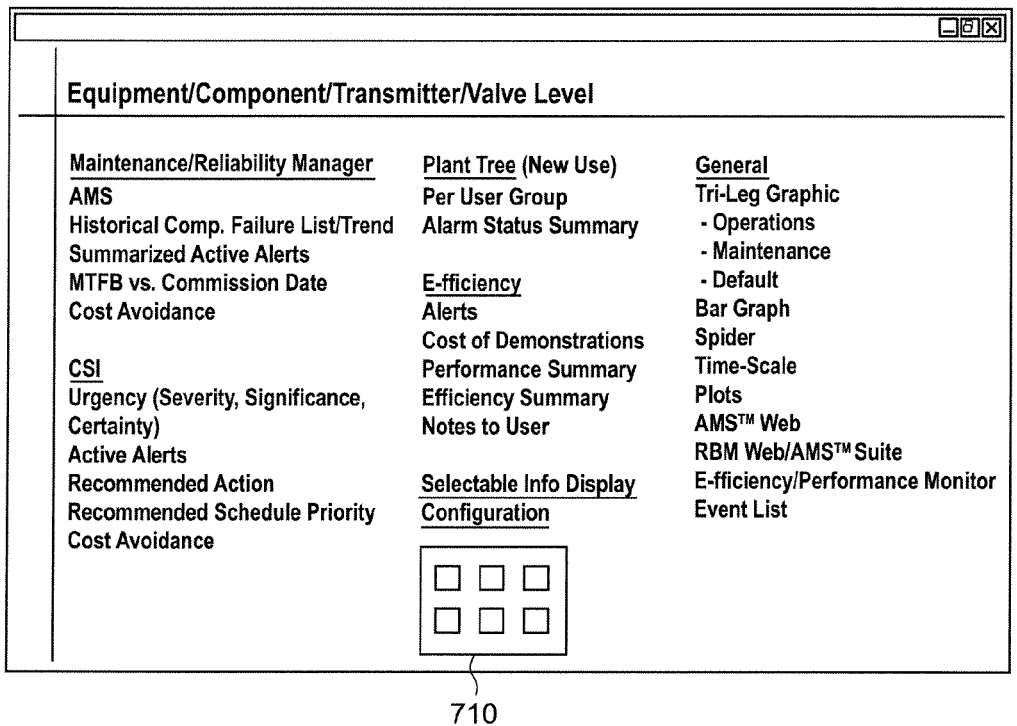
FIG. 25 is an example graphical display that may be provided by a graphical user interface to enable a user to status information regarding equipment, a component, a transmitter or a valve.

Displays similar to that shown in FIG. 21 may be provided for each level or entity within the process plant 10. For example, FIGS. 22-25 are exemplary depictions of displays that may be provided by the GUI to view status information for an area (FIG. 22), a unit (FIG. 23), a loop or device (FIGS. 24 and 25). Each of the displays shown in FIGS. 22-25 are shown to have a menu with status information headings, each of which may be linked to a further report containing detailed status information that may be displayed in response to a user request to view that type of status information. A summary of the components that make up an area (e.g., Unit 1, Unit 2), the components that make up a unit (e.g., 5 transmitters, 2 valves, etc.), or any other level are provided alongside a summary of the status information for the respective area, unit, loop, device, etc. While the displays of FIGS. 22-23 are shown to include similar types of status information, the values and variables associated with the status information will generally change with each entity being reported. For example, in both FIGS. 24 and 25 depict GUIs reporting status information regarding a loop or device. Even more particularly, FIG. 25 depicts a GUI reporting status information regarding equipment, components, transmitters and/or valves. However, the type of status information and arrangement has been altered from that of FIG. 24. Rather, status information has been arranged according to a combination of type of status information (e.g., urgency, alerts, recommendations, etc.) and data sources (e.g., AMS™ Suite of applications, AMS™ Suite: Performance Monitor). Additionally, the user is presented with a variety of display options, including the Selectable Information Display Configuration 710, with which a user may control the arrangement of information, and General presentation options including Tri-leg graphs separated by type (e.g., operations, maintenance, default, etc.), bar graphs, spider graphs, etc.

Each of the displays depicted above and further below may be configurable manually by the user to depict different types of status information the user may be interested in or different levels within the process plant 10. For example, the user may modify which types of status information are to be included in the user's report. Some of the displayed information may, therefore, be dynamic in terms of allowing the user to manipulate and configure the types of status information being displayed and further configure which entities are to be reported on.

In order to manipulate the information to be displayed in a user's report, the GUI may be implemented to display the user's preferences regarding his report. The user is presented with a variety of options on how to configure the report. These options include the types of status information the user may view, the various entities the user may view status information for, options as to how the status information is to be displayed (e.g., graphics, text, etc.), the layout of the status information (e.g., health information centered and pronounced with related production information off-center and less pronounced), etc. Among the options may be status information that must always be included in the report, which is indicated to the user as being static information. The user is able to select from among the available options to add, delete or manipulate the status information. The user profile may then be saved, for example, to a server, and accessed by the asset data/search reporter 60 each time the user calls up a report. Alternatively, the user profile may reside on the user's local computer and be accessed by the user interface routine 58 each time a report is generated. The user may also be permitted to create different reports for different types of status information, different entities, etc. and save each as a separate user profile or as a condition in a single overall user profile. For example, the user profile could contain a provision that if the report is to pertain to an area, a graphical representation of that area is presented with status information displayed in alphanumerics.

Alternatively, the status information displayed in a report may be implemented with a "drag and drop" approach, wherein the user can configure the layout of the report as it is being viewed by selecting an icon representing an entity, dynamic link, status information, etc. The selected icon may be cut and pasted to its new location, or dragged and dropped in its new location. Entities may be merged into other entities by pasting the icons on or dragging the icons to an existing entity, thereby defining functional areas, units, loops, devices, etc. according to the user's needs. Additionally, entities may have as many dynamic links associated with them as desired to bring up information about other entities, other data sources, other reports, other types of status information, etc. As an example, the user may be presented with a default report. This default report may be presented whenever a user accesses a report for the first time (e.g., a new user), accesses a particular type of status information for the first time, accesses status information for a particular entity for the first time, utilizes a new GUI for the first time, etc. The default report may still pertain to particular types of status information for a particular entity, which may relate to the user's responsibilities. That is, even though the user is presented with a default report, a user profile may already be assigned to the user which lists static information to be included in the report and restrictions applicable to the user. In addition, the default report may include dynamic status information predicted by the asset data/search reporter 60 to be of likely higher interest to that the user. It may further be predicted how the user would like to view the information (e.g., the layout). These predictions may be based on historical data representing user interaction with the system and automatically generated by tracking that user interaction, instead of being manually generated by having the user select which options the user would like for reporting. While such manual user configurability may be used, the asset data/search reporter may automatically determine which information should be presented to a user, with or without reference to manually selected user preferences, by personalizing the reported status information based on past user interactions with status information.

In either manual configurability mode or through automatic asset data/search reporter reporting, predictions may also be based on the user's responsibilities within the process plant, other profiles or reports that the user has used, profiles and reports of other users having similar responsibilities, etc. Alternatively, all available status information may be presented to the user in a generic format. However, the user is free to add, delete or otherwise manipulate the dynamic status information in the default report to the user's own preferences.

Each piece of dynamic status information may be presented as a user selectable icon that the user can capture, move, manipulate or delete from the report. Additional status information may be added to the report from a separate menu providing the user with a selection of all types of status information available to the user. The choices and preferences selected by the user may be maintained as part of a user profile, residing at the user's computer, at any data storage device within the process plant 10, or at a storage device located remotely from the process plant 10. Each time the report is reconfigured, the user profile may be updated and stored such that the user's preferences are always current and the next time the user views the report, it will be displayed according to the last known preferences. A user may also need to view numerous reports on various entities and status information. If desired, a separate profile for each type of report may be maintained, thereby allowing the user to configure each report separately. For example, a maintenance person may view health and performance data when viewing a report on a first device, but may only want to view health information when viewing a report on a second device. Alternatively, the same layout and type of status information (still based on the user's preferences) may be included in each report for various areas, units, loops, devices, etc. Each time a user views a report, the user interface routine 58 may determine the user's identity (e.g., at a login screen), and retrieve the user profile associated with that identity. If the user profile is dependent on the entity or status information being reported, a user request for the particular entity or status information may prompt the user interface routine 58 to retrieve the appropriate profile. The user interface routine 58 may then read the profile and display the information accordingly.

However, it may be preferable that some static information be implemented that the user must always keep in the report. For example, a report for a maintenance person assigned to monitor and maintain a particular device may have the health index for that device always displayed, whereas information regarding the performance and efficiency of the device may be dynamic information the maintenance person has selected to include in a maintenance report or that the asset data/search reporter has automatically identifies as appropriate status information to include. That is, the maintenance person may manually decide or the asset data/search reporter may automatically decide to include the performance and efficiency information, because it has an appreciable impact on the health of the device. Likewise, a report directed to a process operator may always include status information regarding the performance and efficiency of the loop being controlled, in addition to user configurable dynamic information such as health information of the devices within that loop, because the health of the device may have a future impact on the operation of the loop, and is therefore of interest to the process operation.

The asset data/search reporter may be configured to prioritize static or dynamic status information on plant assets and based on tracked historical data from user interaction with static or dynamic status information.

The static information may also reside in the user profile, though the user will not be permitted to configure the static information. For example, the user's responsibilities and duties within the process plant 10 may be indicated in the user profile without allowing the user to modify those responsibilities and duties. A maintenance person, therefore, could have a user profile describing his specific position (e.g., maintenance person), the devices, loops, etc. that the maintenance person is responsible for, particular duties with respect to these assets (e.g., monitor device health), etc. The user profile may also include restrictions, that the user cannot manually alter or the asset data/search reporter cannot automatically alter, which restrict what the status information the user is allowed to view in a report. The restrictions may be imposed based on reading the user's responsibilities, for example. The asset data/search reporter may therefore read the user profile to determine not only the user's preferences, but also details regarding the user in order to display particular types of status information that are of interest to the user and also status information that must necessarily be reported to the user to allow the user to complete his duties and responsibilities.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of reporting status information, the method comprising:
   receiving, at a process control user interface, a user request from a user and identifying an area or device within a process plant based on the user request, wherein the area or device is associated with a first plurality of status indicators representing a measurement of health or performance of the area or device, each of the first plurality of status indicators representing a status of the area or device;
   receiving, from a data source in response to the user request, user-personalized status indicators regarding the area or device, wherein the user-personalized status indicators represent a personalized selection, with respect to the user, of a subset of the first plurality of status indicators based on profile data associated with the user;
   prioritizing the user-personalized status indicators based on historical user preference data of the user to identify a subset of high priority user-personalized status indicators within the user-personalized status indicators, wherein prioritizing the user-personalized status indicators comprises:
      (i) automatically tracking user interaction data representing a frequency with which a user has viewed a plurality of previously displayed status indicators, where the plurality of previously displayed status indicators may include one or more of the user-personalized status indicators and where such user tracking occurs automatically without user initiated activation using an internal user interaction tracker capable of uninterrupted tracking of user interactions,
      (ii) profiling historical data, in response to tracking the user interaction data, to identify the historical user preference data, the historical user preference data identifying one or more of the user-personalized status indicators as correlated to the user based on interaction time with one or more of the previously displayed status indicators, and
      (iii) designating the one or more user-personalized status indicators correlated to the user as the high priority user-personalized status indicators;

generating a user-tailored report that includes the high priority user-personalized status indicators ranked above other of the user-personalized status indicators; and displaying, to the user, the user-tailored report that includes the high priority user-personalized status indicators ranked above other of the user-personalized status indicators.

2. The method of claim 1, wherein the user interaction data is tracked during a search for the status information regarding an area or device within the process plant.

3. The method of claim 1, wherein the user interaction data represents a number of times a user interacts with the plurality of previously displayed status indicators.

4. The method of claim 1, wherein the user interaction data represents the frequency within which one or more of the plurality of previously displayed status indicators has been accessed by a user.

5. The method of claim 1, wherein the first plurality of status indicators comprises a health index, a variability index, a usability index, or a performance index.

6. The method of claim 1, wherein the first plurality of status indicators comprises an alert status or urgent event status.

7. The method of claim 1 further comprising continuously tracking the user interaction data.

8. The method of claim 1 further comprising tracking the user interaction data in response to a remote initiation signal.

9. The method of claim 1, wherein prioritizing the user-personalized status indicators identifies the high priority user-personalized status indicators and lower priority user-personalized status indicators, and wherein the report displays only the high priority user-personalized status indicators.

10. The method of claim 1, wherein prioritizing the user-personalized status indicators identifies the high priority user-personalized status indicators and lower priority user-personalized status indicators, and wherein the report displays both the high priority user-personalized status indicators and the lower priority user-personalized status indicators.

11. The method of claim 1, wherein prioritizing the user-personalized status indicators comprises prioritizing based on a single profile parameter of the historical user preference data.

12. The method of claim 11 further comprising:
ranking the user-personalized status indicators based on a first profile parameter to determine a first data ranking; and
ranking the first data ranking based on at least one second profile parameter to produce a second data ranking.

13. The method of claim 1, wherein prioritizing the user-personalized status indicators comprises prioritizing based on multiple profile parameters of the historical user preference data.

14. The method of claim 1, wherein the user request is a first search request, wherein the user-personalized status indicators contain initial search results data in response to the first search request, wherein generating the user-tailored report comprises generating a search report containing the high priority user-personalized status indicators, and wherein displaying the user-tailored report comprises displaying the search report containing the high priority user-personalized status indicators.

15. The method of claim 14 further comprising displaying the user-personalized status indicators separately from the search report.

16. The method of claim 14, wherein the high priority user-personalized status indicators represent predicted search results in response to the first search request.

17. The method of claim 16 further comprising:
receiving a second search request from the user, the second search request being received after the first search request;
prioritizing the high priority user-personalized status indicators of the search report based on the second search request to create a second search report; and
displaying the second search report to a user.

18. The method of claim 17, wherein the second search report contains only a subset of the high priority user-personalized status indicators of the search report.

19. The method of claim 17, wherein the second search report contains all of the high priority user-personalized status indicators of the search report but where the priority of the high priority user-personalized status indicators has been rearranged in the second search report.

20. The method of claim 1, wherein the historical user preference data comprises information regarding past user access to a status indicator regarding an area or device within the process plant.

21. The method of claim 1, further comprising:
correlating the user-personalized status indicators to other correlated status indicators for at least one other area or device in the process plant, such that the subset of high priority user-personalized status indicators includes one or more of the other correlated status indicators and such that the status report displayed to the user includes one or more of the other correlated status indicators,
displaying a report of the other correlated status indicators to the user.

22. The method of claim 1, wherein displaying the report to the user comprises:
displaying at least one graphical illustration of the report illustrating a graphical plot relating to the high priority user-personalized status indicators.

23. The method of claim 22, further comprising displaying a plurality of different graphic illustrations of the report via a plurality of different graphical plots relating to the high priority user-personalized status indicators, each graphical plot plotting the high priority user-personalized status indicators based on a different plot criteria.

24. A method of reporting status information, the method comprising:
receiving, at a process control user interface, a user request from a user and identifying an area or device within a process plant based on the user request, wherein the area or device is associated with a first plurality of status indicators, each of the first plurality of status indicators representing a measurement of health or performance of the area or device;
receiving, from a data source in response to the user request, user-personalized status indicators regarding the area or device, wherein the user-personalized status indicators represent a personalized selection, with respect to the user, of a subset of the first plurality of status indicators based on profile data associated with the user;
prioritizing the user-personalized status indicators based on historical user preference data of the user to identify a subset of high priority user-personalized status indicators within the user-personalized status indicators, wherein prioritizing the user-personalized status indicators comprises:

(i) automatically tracking, and storing as historical data, user interaction data representing a frequency with which a user has viewed a plurality of previously displayed status indicators, where the plurality of previously displayed status indicators may include one or more of the user-personalized status indicators and where such user tracking occurs automatically without user initiated activation using an internal user interaction tracker capable of uninterrupted tracking of user interactions, (ii) analyzing the historical data to identify the historical user preference data, the historical user preference data identifying one or more of the user-personalized status indicators as correlated to the user based on interaction time with one or more of the previously displayed status indicators, and;

(iii) designating the one or more user-personalized status indicators correlated to the user as the high priority user-personalized status indicators;

determining an assurance factor for the higher priority status information;

generating a user-tailored report that includes the high priority user-personalized status indicators ranked above other of the user-personalized status indicators;

displaying the user-tailored report to the user by displaying only the high priority user-personalized status indicators if the assurance factor is above a threshold value and displaying the high priority user-personalized status indicators and the lower priority user-personalized status indicators if the assurance factor is below a threshold value.

25. An apparatus for reporting status information, the apparatus comprising:

a memory storing status indicators on the areas or devices within the plant;

a display for displaying a user-tailored report regarding an area or device within the plant; and a status information reporter configured to:

a) receive user-personalized status indicators representing a measurement of health or performance of the area or device from a data source in response to a user request, wherein the user-personalized status indicators represent a personalized selection, with respect to the user, of a subset of the user-personalized status indicators based on profile data associated with a user;

b) prioritize the user-personalized status indicators based on historical user preference data of the user to identify a subset of high priority user-personalized status indicators within the user-personalized status indicators, where the historical user preference data is determined by (i) automatically tracking user interaction data representing a frequency with which a user has viewed previously displayed status indicators regarding the area or device, without user initiated activation using an internal user interaction tracker capable of uninterrupted tracking of user interactions, (ii) analyzing the user interaction data to identify the historical user preference data, the historical user preference data identifying one or more of the user-personalized status indicators as correlated to the user based on the historical data, and (iii) designating the one or more of the user-personalized status indicators correlated to the user as the high priority user-personalized status indicators;

c) correlate the user-personalized status indicators to other correlated status information, such that the subset of higher priority information includes the other correlated status information; and d) generate the user-tailored report that includes the high priority user-personalized status indicators ranked above other of the user-personalized status indicators.

26. The apparatus of claim 25, wherein the status information reporter is configured to profile historical data, in response to data from tracking the user interactions, to identify the historical user preference data, the historical data representing past user interaction with status indicators regarding the area or device.

27. The apparatus of claim 25, wherein the status information reporter is configured to:

store the user interaction data regarding user interaction with status information on an area or device within the process plant and displayed by a computer; and analyze the user interaction data to develop the user preference data.

28. The apparatus of claim 27, wherein the user interaction data is data tracked during a search for status indicators regarding the area or device.

29. The apparatus of claim 27, wherein the user interaction data represents an amount of time a user interacts with status indicators regarding the area or device.

30. The apparatus of claim 27, wherein the user interaction data represents a number of times a user interacts with status indicators regarding the area or device.

31. The apparatus of claim 27, wherein the user interaction data represents the frequency within which status indicators regarding the area or device have been accessed by a user.

32. The apparatus of claim 27, wherein the user-personalized status indicators regarding the area or device comprise a health index, a variability index, a usability index, or a performance index.

33. The apparatus of claim 27, wherein the user-personalized status indicators regarding the area or device comprise an alert status or urgent event status.

34. The apparatus of claim 27, wherein the status information reporter is configured to continuously track user interaction data.

35. The apparatus of claim 27, wherein the status information reporter is configured to track user interaction data in response to a remote initiation signal.

36. The apparatus of claim 25, wherein the status information reporter is configured to report only the high priority user-personalized status indicators.

37. The apparatus of claim 25, wherein the status information reporter is configured to report the high priority user-personalized status indicators and lower priority user-personalized status indicators.

38. The apparatus of claim 25, wherein the status information reporter is configured to:

rank the user-personalized status indicators based on a first profile parameter to determine a first data ranking; and rank the first data ranking based on at least one second profile parameter to produce a second data ranking.

39. The apparatus of claim 25, wherein the status information reporter is configured to prioritize the user-personalized status indicators based on multiple profile parameters of the user preference data.

40. The apparatus of claim 25, wherein the user preference data comprises information regarding past user access to status indicators regarding the area or device.

41. The apparatus of claim 25, wherein the status information reporter is configured to:

display a report of the other correlated status information to the user.

42. The apparatus of claim 25, further comprising a display controller configured to:
 display at least one graphical illustration of the report illustrating a graphical plot of information relating to the high priority user-personalized status indicators.

43. The apparatus of claim 25, wherein the display controller is further configured to display a plurality of different graphic illustrations of the report via a plurality of different graphical plots of the information relating to the high priority user-personalized status indicators, each graphical plot plotting the information relating to the high priority user-personalized status indicators based on a different plot criteria.

* * * * *